(12) United States Patent
Hamasni et al.

(10) Patent No.: US 12,380,413 B2
(45) Date of Patent: *Aug. 5, 2025

(54) SYSTEM AND METHOD FOR COMPOSITE CRYPTOGRAPHIC TRANSACTIONS

(71) Applicant: ROYAL BANK OF CANADA, Toronto (CA)

(72) Inventors: Karim Talal Hamasni, Toronto (CA); Stefan Mueller, Singapore (SG); Atilla Murat Firat, Toronto (CA); Matthew Thomas Peskett, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 242 days.

This patent is subject to a terminal disclaimer.

(21) Appl. No.: 17/962,097

(22) Filed: Oct. 7, 2022

(65) Prior Publication Data

US 2023/0029193 A1   Jan. 26, 2023

Related U.S. Application Data

(63) Continuation of application No. 16/373,204, filed on Apr. 2, 2019, now Pat. No. 11,468,412.

(60) Provisional application No. 62/651,339, filed on Apr. 2, 2018, provisional application No. 62/651,342, filed on Apr. 2, 2018.

(51) Int. Cl.
*G06Q 20/06* (2012.01)
*G06Q 20/36* (2012.01)
(Continued)

(52) U.S. Cl.
CPC ....... *G06Q 20/0658* (2013.01); *G06Q 20/065* (2013.01); *G06Q 20/3678* (2013.01);
(Continued)

(58) Field of Classification Search
CPC ............ G06Q 20/0658; G06Q 20/065; G06Q 20/3678; G06Q 20/381; G06Q 20/401;
(Continued)

(56) References Cited

U.S. PATENT DOCUMENTS 9,892,460 B1   2/2018   Winklevoss et al.
10,346,815 B2 *  7/2019   Glover ................. H04L 9/3239
(Continued)

OTHER PUBLICATIONS

Satoshi Nakamoto, Bitcoin: A Peer-to-Peer Electronic Cash System, 2008, www.bitcoin.org.
(Continued)

*Primary Examiner* — John W Hayes
*Assistant Examiner* — Yingying Zhou
(74) *Attorney, Agent, or Firm* — Norton Rose Fulbright Canada LLP

(57) ABSTRACT

A composite cryptographic data structure is described, and corresponding methods, systems, and computer readable media. The composite cryptographic data structure is instantiated based on an underlying set of cryptographic tokens (e.g., blockchain/distributed ledger tokens) that, in some embodiments, are transferrable through on-chain transactions established on one or more distributed ledger networks. Identity validation, in some embodiments, may occur at one of composite cryptographic data structure instantiation or composite cryptographic data structure redemption, or both, through the use of a whitelist or a blacklist data structure.

13 Claims, 12 Drawing Sheets

(51) Int. Cl.
*G06Q 20/38* (2012.01)
*G06Q 20/40* (2012.01)
*H04L 9/00* (2022.01)
*H04L 9/08* (2006.01)

(52) U.S. Cl.
CPC ....... *G06Q 20/381* (2013.01); *G06Q 20/3829* (2013.01); *G06Q 20/389* (2013.01); *G06Q 20/401* (2013.01); *H04L 9/0894* (2013.01); *G06Q 2220/00* (2013.01); *H04L 9/50* (2022.05); *H04L 2209/56* (2013.01)

(58) Field of Classification Search
CPC ............ G06Q 20/3829; G06Q 20/389; G06Q 2220/00; G06Q 20/027; G06Q 20/202; G06Q 20/3676; G06Q 20/0655; H04L 9/0894; H04L 2209/56; H04L 2209/38; H04L 63/102; H04L 63/0442; H04L 9/3239
See application file for complete search history.

(56) References Cited

U.S. PATENT DOCUMENTS

| | | |
|---|---|---|
| 10,909,509 B1 | 2/2021 | Kurani |
| 11,354,738 B1 | 6/2022 | Kurani |
| 11,522,700 B1 * | 12/2022 | Auerbach ............. H04L 9/3213 |
| 2015/0170112 A1 | 6/2015 | DeCastro |
| 2015/0262140 A1 | 9/2015 | Armstrong |
| 2015/0324764 A1 | 11/2015 | Van Rooyen et al. |
| 2015/0332256 A1 | 11/2015 | Minor |
| 2016/0335628 A1 | 11/2016 | Weigold |
| 2016/0342978 A1 | 11/2016 | Davis et al. |
| 2017/0140371 A1 | 5/2017 | Forzley et al. |
| 2017/0300978 A1 | 10/2017 | Narasimhan et al. |
| 2018/0089760 A1 * | 3/2018 | Stradling ............... G06Q 40/00 |
| 2019/0026733 A1 | 1/2019 | van Bemmelen |
| 2019/0236593 A1 | 8/2019 | Vorobyev et al. |
| 2019/0289019 A1 | 9/2019 | Thekadath et al. |

OTHER PUBLICATIONS

USPTO, Restriction Requirement dated Feb. 18, 2021 issued to U.S. Appl. No. 16/373,204.
USPTO, Non Final Rejection dated Aug. 9, 2021 issued to U.S. Appl. No. 16/373,204.
USPTO, Examiner-Initiated Interview Summary dated Feb. 23, 2022 issued to U.S. Appl. No. 16/373,204.
USPTO, Final Rejection dated Mar. 11, 2022 issued to U.S. Appl. No. 16/373,204.
USPTO, Non Final Rejection dated Feb. 10, 2022 issued to U.S. Appl. No. 16/373,471.
USPTO, Final Rejection dated Jul. 21, 2022 issued to U.S. Appl. No. 16/373,471.

* cited by examiner

SYSTEM AND METHOD FOR COMPOSITE CRYPTOGRAPHIC TRANSACTIONS

CROSS-REFERENCE

This application is a Continuation of U.S. application Ser. No. 16/373,204 filed on Apr. 2, 2019, which is a non-provisional of, and claims all benefit, including priority to: U.S. Application No(s): 62/651,339 and 62/651,342, both filed Apr. 2, 2018, both entitled, SYSTEM AND METHOD FOR COMPOSITE CRYPTOGRAPHIC TRANSACTIONS, incorporated herein by reference.

FIELD

Embodiments of the present disclosure relate generally to the field of cryptographic platforms, and some embodiments particularly relate to systems, methods and devices for cryptographic platforms involving multiple crypto-assets.

INTRODUCTION

The enthusiasm surrounding Bitcoin, blockchain and token-based technologies has given rise to numerous cryptocurrencies. To individual users, managing cryptographic keys and transacting with different cryptographic assets can be a challenge.

Furthermore, validating and ensuring know-your-client/anti-money laundering processes can be cumbersome, and computationally intensive, especially where data objects are being transacted upon freely in an open market absent specific client identifiers during such transactions.

Scalability thus becomes a major consideration when a large amount of potential cryptographic tokens are circulated that have additional security protections in place to ensure auditability and traceability as it relates to regulatory requirements.

SUMMARY

As described in various embodiments, a composite cryptographic data structure is described, and corresponding methods, systems, and computer readable media.

The composite cryptographic data structure is instantiated based on an underlying set of cryptographic tokens (e.g., blockchain/distributed ledger tokens) that, in some embodiments, are transferrable through on-chain transactions established on one or more distributed ledger networks. Identity validation, in some embodiments, may occur at one of composite cryptographic data structure instantiation or composite cryptographic data structure redemption, or both, through the use of a whitelist or a blacklist data structure.

The composite cryptographic data structure, in some embodiments, is a data structure that is adapted to persist on a distributed ledger that is adapted for holding and performing operations (e.g., state transitions and associated actions), through, for example, a digital protocol to facilitate, verify, and/or enforce policies in relation to the performance of an underlying set of logical conditions (e.g., a smart contract data object, or tokens minted by/interacted with in accordance with an overarching smart contract data object). The state changes of the smart contract and/or composite cryptographic data structures can be self-executing or self-enforced based on the establishment of triggering conditions, and through received messages that initiate state transitions (e.g., messages with corresponding cryptographic authorization keys).

The composite data structures are configured for interoperation with internal ledger based asset recordal mechanisms (e.g., a recordal platform) and are instantiated when a request is generated to establish an on-chain representation that can be interacted with by members of the public (or private members of a private blockchain, in another embodiment).

Accordingly, the on-chain representation can be established for transfers as between different individuals or entities through on-chain modifications of parameters of the composite data structures (e.g., authorizing a new public key address to be recorded to indicate the new owner of the composite data structure). The underlying cryptographic tokens are not interacted with during these transfers. The composite cryptographic data structures themselves can thus be fungible through updates to the distributed ledgers, for example, as new blocks representing state changes/ownership changes are added. The on-chain representation can be queried, for example, to assess which public keys (e.g., addresses) are the current owners of each token representation. The querying can be conducted by a block explorer.

Furthermore, the composite data structures, in some embodiments, are adapted such that the total amount of underlying cryptographic tokens can be reconciled against a custodial storage amount (e.g., total amount in an escrow vault, cold storage being provided as an example in various embodiments) through a reference mechanism that reduces an overall required level of computation that would otherwise be required. The reference mechanism can be a reference data structure that caches or otherwise includes prior multiplication values, and is updated over time as new calculations are conducted.

The reference mechanism is adapted to provide an alternative to the computationally expensive approach of conducting bit-wise multiplication for each holding, which can be extremely computationally expensive if there are a large number of composite cryptographic data structures. Accordingly, instead of conducting a multiplication for each leaf node of the underlying cryptographic assets, the reference mechanism can be utilized, if a saved pre-calculation exists for a particular pair of values.

When the composite data structure is instantiated, the underlying set of cryptographic tokens have been/are recorded or otherwise obtained for storage at a cryptographic storage facility (e.g., "minted" for storage into cold storage). In some embodiments, the underlying set of cryptographic tokens can also include other composite data structures (e.g., baskets of baskets).

In some embodiments, the underlying set of cryptographic tokens for each composite data structure is pooled into one or more cryptographic storage facilities under the custody of one or more custodial computing systems (e.g., financial institution computing systems that manage or integrate with an escrow vault), and accordingly, the cryptographic storage facility stored tokens are allotted and tracked for each of the composite data structures.

The composite data structures themselves can be transferred between different entities, for example, through updates to either an off-chain ledger, or recorded on on-chain transactions, according to various embodiments.

In some embodiments, the composite data structure includes one or more policy rules that are automatically triggered in various states that cause re-balancing of the underlying allotment of cryptographic tokens and transactions thereof for re-balancing of the underlying allotment of cryptographic tokens in accordance with maintaining a particular characteristic as between the underlying allotment of cryptographic tokens (e.g., to maintain a relative value balance as between the different underlying cryptographic tokens), established based on a market price from a designated oracle entity or other type of market reference (e.g., midpoint of bid/ask at a high volume exchange based on published market data received from an application programming interface).

The composite data structure is configured with a state transition rule established for redemption of the underlying allotment of cryptographic tokens. When this state transition is invoked, the allotment of cryptographic tokens is repatriated such that the allotment of cryptographic tokens are transitioned from the one or more custodial cryptographic storage elements to one or more addresses designated by the redemption message. Addresses, for example, can include cryptographic public keys which may have corresponding private keys held by one or more users or one or more entities.

The composite data structure is then transitioned such that an address without a recorded corresponding private key is set as an authorized entity, effectively rendering the composite data structure inaccessible and rendered dormant (e.g., the composite data structure is "burned").

In some embodiments, the composite data structure includes or references a whitelist or a blacklist data structure indicating specific addresses upon which the allotment of cryptographic tokens can be released to.

In an embodiment, the whitelist data structure can be maintained across one or more financial institution computing systems such that the whitelist data structure only contains addresses whose owners/users are known to have passed corresponding regulatory identity requirements (e.g., know-your-client, anti-money laundering, sanctions). Each of these one or more financial institution computing systems can transmit messages to the on-chain representation of the smart contract data structure to update the whitelist data structure over time, such messages being recorded as blocks on a blockchain that provide an immutable record of whitelist activities and addresses, which can then be accessed by an auditor to review which institution and what checks a user had to pass to provide such address to the whitelist. Similarly, removals from the whitelist can be transacted through data messages transmitted to the blockchain and added as transaction blocks, and be similarly audited.

The whitelist data structure can be stored, for example, as an update-able payload on the smart contract data structure, or in the composite data structures themselves. In some embodiments, the composite data structures are configured to reference an external whitelist data structure as part of the redemption state.

Conversely, the blacklist data structure can be maintained across one or more financial institution computing systems such that the blacklist data structure only contains addresses whose owners/users are known to have failed corresponding regulatory identity requirements (e.g., know-your-client, anti-money laundering, sanctions).

For a release of assets, in some embodiments, a release function can only be invoked by an owner whose public address exists on the whitelist data structure (or does not exist on the blacklist data structure, in the variant embodiment), The release function causes a redemption process to be initiated, where the owner of the assets can direct one or more new addresses for the released cryptographic tokens to be transferred from a custodial mechanism (e.g., the one or more cold storage wallets).

The system allows for lower-friction transactions and lower cost of transactions, as the underlying cryptographic tokens incur less transaction fees. Furthermore, the system provides increased security through the use of specially configured data structures that are referred to for validating and enforcing know-your-client type requirements efficiently at at least one of the instantiation process or the redemption process.

Furthermore, as described in various embodiments herein, the composite data structure is configured for easier traversal and validation against cold storage repositories to ensure and/or audit that such custodial amounts match the amount outstanding on the composite data structures stored on-chain. In particular, additional data structures based on the composite data structures may be maintained and thus utilized to facilitate the verification process, as opposed to a multiplicative process, which could be unduly computationally expensive.

Accordingly, in some embodiments, aspects of the present disclosure provide a crypto-asset platform for handling transactions involving composite crypto-assets.

In accordance with one aspect, there is provided a system comprising: at least one memory for storing a customer account; and at least one processor communicably coupled to the at least one memory, the memory including executable instructions. The instructions, when executed by the at least one processor, configure the system for: receiving an electronic request to acquire a composite crypto-asset, the composite crypto-asset corresponding to a composite template defining a plurality of types of crypto-assets and their respective quantities represented by the composite crypto-asset; generating a plurality crypto-asset transactions to acquire the quantities of the plurality of types of crypto-assets defined by the composite template; storing cryptographic keys corresponding to the acquired quantities of the plurality of types of crypto-assets in an escrow vault; and updating a balance of the composite crypto-asset associated with the customer account based on a quantity associated with the electronic request.

In accordance with another aspect, there is provided a system comprising: at least one memory for storing a customer account; and at least one processor communicably coupled to the at least one memory, the memory including executable instructions which when executed by the at least one processor configure the system for: receiving electronic signals for a transfer of a composite crypto-asset, the electronic signals including data for identifying the customer account as a destination for the transfer, the composite crypto-asset corresponding to a composite template defining a plurality of types of crypto-assets and their respective quantities represented by the composite crypto-asset; burning the composite crypto-asset; and updating a balance of the composite crypto-asset associated with the customer account based on a quantity associated with the transfer.

In some of the above or other embodiments there is provided a system comprising a memory including executable instructions which when executed by the at least one processor configure the system for: receiving a transfer request to transfer a second quantity of the composite crypto-asset associated with the customer account to a destination blockchain address; updating the balance of the composite crypto-asset associated with the customer account based on the second quantity of the composite crypto-asset to be transferred; and triggering generation of a crypto-asset token corresponding to the second quantity of the of the composite crypto-asset to be transferred, and transfer of the crypto-asset token to the destination blockchain address.

In some of the above or other embodiments there is provided a system comprising a memory including executable instructions which when executed by the at least one processor configure the system for: receiving a decompose request to decompose a second quantity of the composite crypto-asset associated with the customer account; updating the balance of the composite crypto-asset associated with the customer account based on the second quantity of the composite crypto-asset to be transferred; and using the cryptographic keys corresponding to the plurality of types of crypto-assets in an escrow vault, transferring quantities of the plurality of types of crypto-assets, corresponding to the second quantity, from addresses associated with the escrow account to addresses associated with the customer account.

In some of the above or other embodiments there is provided a system comprising a memory including executable instructions which when executed by the at least one processor configure the system for: receiving a sell request to sell a second quantity of the composite crypto-asset associated with the customer account; updating the balance of the composite crypto-asset associated with the customer account based on the second quantity of the composite crypto-asset to be transferred; using the cryptographic keys corresponding to the plurality of types of crypto-assets in an escrow vault, transferring quantities of the plurality of types of crypto-assets, corresponding to the second quantity of the composite crypto-asset, from addresses associated with the escrow account to addresses associated with a crypto-asset exchange; and updating a fiat balance associated with the customer account based on fiat amounts received from transferring the quantities of the plurality of types of crypto-assets.

DESCRIPTION OF THE FIGURES

Reference will now be made to the drawings, which show by way of example embodiments of the present disclosure.

DESCRIPTION OF EXAMPLE EMBODIMENTS

As described in various embodiments, a composite cryptographic data structure is described, and corresponding methods, systems, and computer readable media.

The composite cryptographic data structure is instantiated based on an underlying set of cryptographic tokens (e.g., blockchain/distributed ledger tokens) that, in some embodiments, are transferrable through on-chain transactions established on one or more distributed ledger networks.

Identity validation, in some embodiments, may occur at one of composite cryptographic data structure instantiation or composite cryptographic data structure redemption, or both, through the use of a whitelist or a blacklist data structure.

Figure 1A:
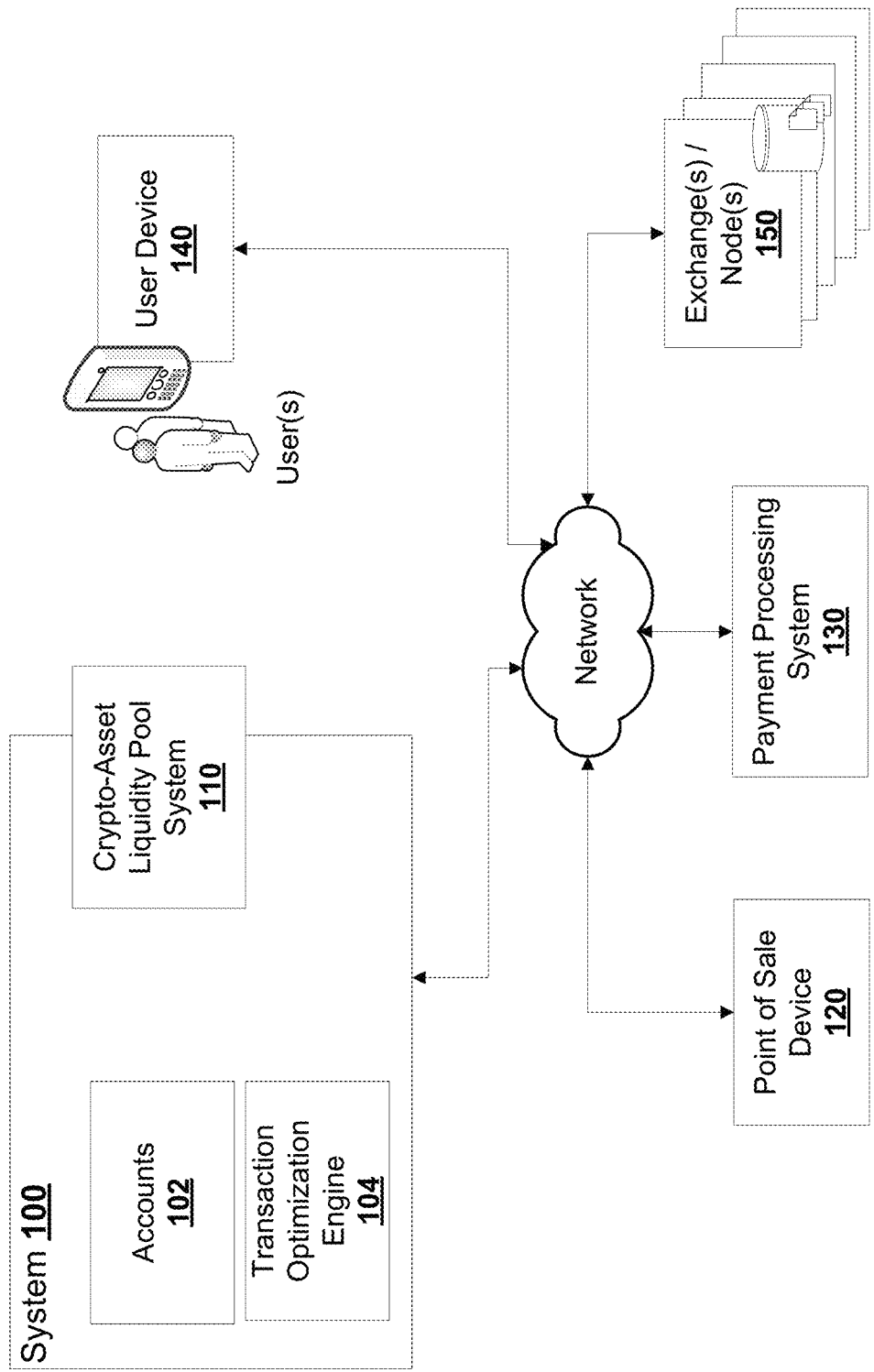
FIG. 1A is a schematic diagram showing aspects of an example electronic crypto-asset platform, according to some embodiments.

FIG. 1A shows an example system 100 for managing crypto-assets and/or transactions. The system 100 includes one or more electronic devices having one or more memories, processors, storage devices, communication interfaces, among others.

The system 100 includes at least one memory for storing a customer account; and at least one processor communicably coupled to the at least one memory, the memory including executable instructions.

The system 100 includes an internal ledger data storage 112, along with custodial repository systems 114 and identity management data processors 116. A distributed ledger interface 118 is provided that is adapted to interact with a crypto-asset liquidity pool system 110.

The system is configured to receive electronic requests to instantiate a composite crypto-asset data structure, or to the composite crypto-asset data structure corresponding to a composite template defining a plurality of types of crypto-assets and their respective quantities represented by the composite crypto-asset data structure. The processor is configured to generate a plurality crypto-asset transactions to acquire the quantities of the plurality of types of crypto-assets defined by the composite template.

A key management mechanism is provided (e.g., data storage 112) that is adapted for storing cryptographic keys corresponding to the acquired quantities of the plurality of types of crypto-assets in an escrow vault. The internal ledger data storage 112, is part of a platform adapted for coordinating crypto-currency transactions to purchase crypto-currency assets, stored by proxy through the composite-crypto asset data structures. When a user or entity submits a request to establish a new composite-crypto asset data structure, a new record corresponding to a new composite-crypto asset data structure is generated on the internal ledger data storage 112.

In some embodiments, the user or entity provides a record of payment, and the system 100 is adapted to purchase or otherwise obtain the underlying crypto-assets. In other embodiments, the user or entity provides cryptographic keys that are used to transfer the crypto-assets. The crypto-assets are stored in the custodial repository systems 114, which can include, for example, one or more cold-storage wallets or mechanisms.

The custodial repository systems 114 store the underlying set of cryptographic tokens, which can be pooled across different composite-crypto asset data structures. The underlying set of cryptographic tokens remain housed within (e.g., their private keys are kept for safekeeping) by the custodial repository systems 114, which can include secured processors, such as secure enclave, air-gapped computer devices, among others.

The system 100 tracks balances of the composite-crypto asset data structure associated with the customer account based on a quantity associated with the electronic request, which can be used for downstream reconciliation.

The composite crypto-asset data structure is a smart contract data object or generated based on a smart contract data object stored on a publicly accessible blockchain distributed ledger network. The smart contract data object includes logical instructions, which when triggered as one or more monitored conditions are satisfied, cause state transitions of the smart contract data object from states that include at least a minting state, a transaction state, a redemption state, and a burn state.

When user or entity a requests a new composite-crypto asset data structure to be tracked on the internal ledger data storage 112, in some embodiments, an address of the user or entity can be added to a whitelist data structure, indicative of users or entities for whom regulatory identity management requirements have been satisfied (e.g., know your client, anti-money laundering, sanctions, etc.).

The whitelist data structure, in some embodiments, is a shared reference resource (e.g., a database, a look up table) of cryptographic addresses that is utilized by identity management data processors 116 for validation and/or auditing.

When the new composite-crypto asset data structure is instantiated on the on-chain distributed ledger, the new composite-crypto asset data structure is addressed initially to the initial address provided by the original user or entity, which can be automatically whitelisted. The composite-crypto asset data structure can be freely transacted upon by transitioning different addresses to indicate ownership of the composite-crypto asset data structure.

When the composite-crypto asset data structure address "owner" (e.g., the individual or entity with the corresponding private key) provides a data message indicative of a redemption request, along with a corresponding target address to deposit to underlying crypto-tokens to, the existing address of the composite-crypto asset data structure can be compared against the whitelist data structure to validate that such address has satisfied the regulatory identity management requirements.

For example, the composite-crypto asset data structure can be transitioned to a new user who may not be validated by the system 100. In this case, the user may need to submit credentials and other information to establish that the regulatory identity management requirements are met.

The user's address is then added to the whitelist data structure. When the user seeks to redeem the composite-crypto asset data structure, the user provides a message indicative of the user's private key corresponding to the public key indicative of ownership, which is validated. The underlying crypto-asset tokens are transmitted from custodial repository systems 114 to an address designated by the validated user. The composite-crypto asset data structure is then "burned" as described in embodiments herein.

One or more aspects of the system 100 are configured to store one or more data structures representing accounts 102, such as customer accounts, or pool accounts. In some embodiments, accounts store or are otherwise associated with one or more crypto-asset keys. In some situations, a pool account can represent an account for holding a pool of crypto-assets for an entity such as a financial institution or crypto-asset liquidity provider.

In some embodiments, accounts store or are associated with data fields which store quantities of fiat currencies, and quantities of one or more composite crypto-assets. In some embodiments, the system 100 includes or can be in communication with a system for providing a crypto-asset liquidity pool 110 (e.g., ERC-20 tokens on the Ethereum network).

The one or more composite crypto-assets can each be a smart contract data object stored as on-chain data objects on the crypto-asset liquidity pool 110, whose state transitions may be transacted upon through one or more messages sent to the crypto-asset liquidity pool 110, along with corresponding encryption keys validating such transactions.

In some embodiments, a crypto-asset liquidity pool 110 is an exchange which converts a crypto-asset into a fiat currency equivalent. In some embodiments, the system 100 includes or can be in communication with nodes and/or exchanges 150 associated with one or more crypto-assets.

In some embodiments, transaction signals and/or requests can be sent to or received from the nodes and/or exchanges, e.g., through corresponding messages by applications generated by user device 140. In some embodiments, interactions with the exchanges 150, which in some embodiments includes the crypto-asset liquidity pool 110, can cause conversions between crypto-assets and fiat currency(ies).

In some embodiments, interactions with the nodes 150, which in some embodiments includes the crypto-asset liquidity pool 110, can affect the transfer of crypto-assets between accounts/devices/addresses. In some embodiments, the system 100 is configured to be in communication with point-of-sale device(s) 120 such as a payment terminal at a retail store or an online payment server, payment processing systems 130 such as a credit card payment processing system/network, user device(s), and/or crypto-asset exchange(s) and/or node(s).

In some embodiments, accounts 102 can store, link, reference or otherwise be associated with one or more keys/addresses. These keys or addresses can point to blockchain locations or can otherwise provide information to determine how many crypto-assets are associated with a particular account.

In some embodiments, accounts can store multiple types of crypto-assets and in such instances will be associated with keys/addresses for different blockchain platforms to provide information as to the quantities of each crypto-asset are stored in/associated with the account. In some embodiments, the account is or is similar to a wallet for storing multiple crypto-assets.

Different types of crypto-assets which can be held in an account include, but are not limited to, Bitcoin, Litecoin, Ether, Ripple and the like. As described herein, an application ecosystem could have centralized cold storage of a variety of crypto-assets. Users of a platform would make deposits into a platform via on-chain transactions, or fiat purchases.

Clients funds would then be pooled into secure cold storage and an internal, database driven ledger system is configured to keep track of each users share of the pooled cold storage contents. Within the platform, these crypto assets are maintained and tracked as separate assets.

Users of the platform my send and receive individual crypto assets to other members of the platform. In an example scenario, there is no on-chain transaction, only an update to an database driven ledger system. The crypto-assets remain dormant in the cold storage, however the balances in the database driven ledger system get updated to reflect each user's individual allotment. If User A wants to send User B a variety of crypto assets, User A would need to initialize multiple crypto asset transfer requests. To simplify the process, User A can generate a 'basket' of crypto assets. This basket can then be transferred as an individual unit type.

User A would initialize basket creation through an interface by selecting the proportion of each type of crypto asset that they'd like to include. Once the proportions are selected, User A is then required to acquire units of the basket token. User A does not assemble assets from their own particular holdings. User A assembles baskets from the crypto-assets that are available via the platform. The basket is stored on the on-chain systems as a composite-crypto asset data structure, which stores a proxy of ownership of the underlying cryptographic assets.

In some embodiments, the system 100 is configured to track crypto-asset transaction data. For example, in some embodiments, the system 100 tracks fiat purchase prices for the crypto-assets held or otherwise associated with an account. In some embodiments, the system 100 tracks fiat sale prices for crypto-assets being sold or transferred from an account. In some embodiments, the composite-crypto asset data structure is configured to automatically submit transaction requests to either an underlying internal ledger or to a market based on the underlying market prices to rebalance allocations of the composite-crypto asset data structure. For example, the composite-crypto asset data structure can be configured for automatic rebalancing to maintain relative proportional values between the underlying crypto-assets.

In some embodiments, the system 100 monitors crypto-asset market prices. In some embodiments, the system 100 also monitors crypto-asset book depth. In some embodiments, the system 100 is configured to manage composite crypto-assets.

Figure 1B:
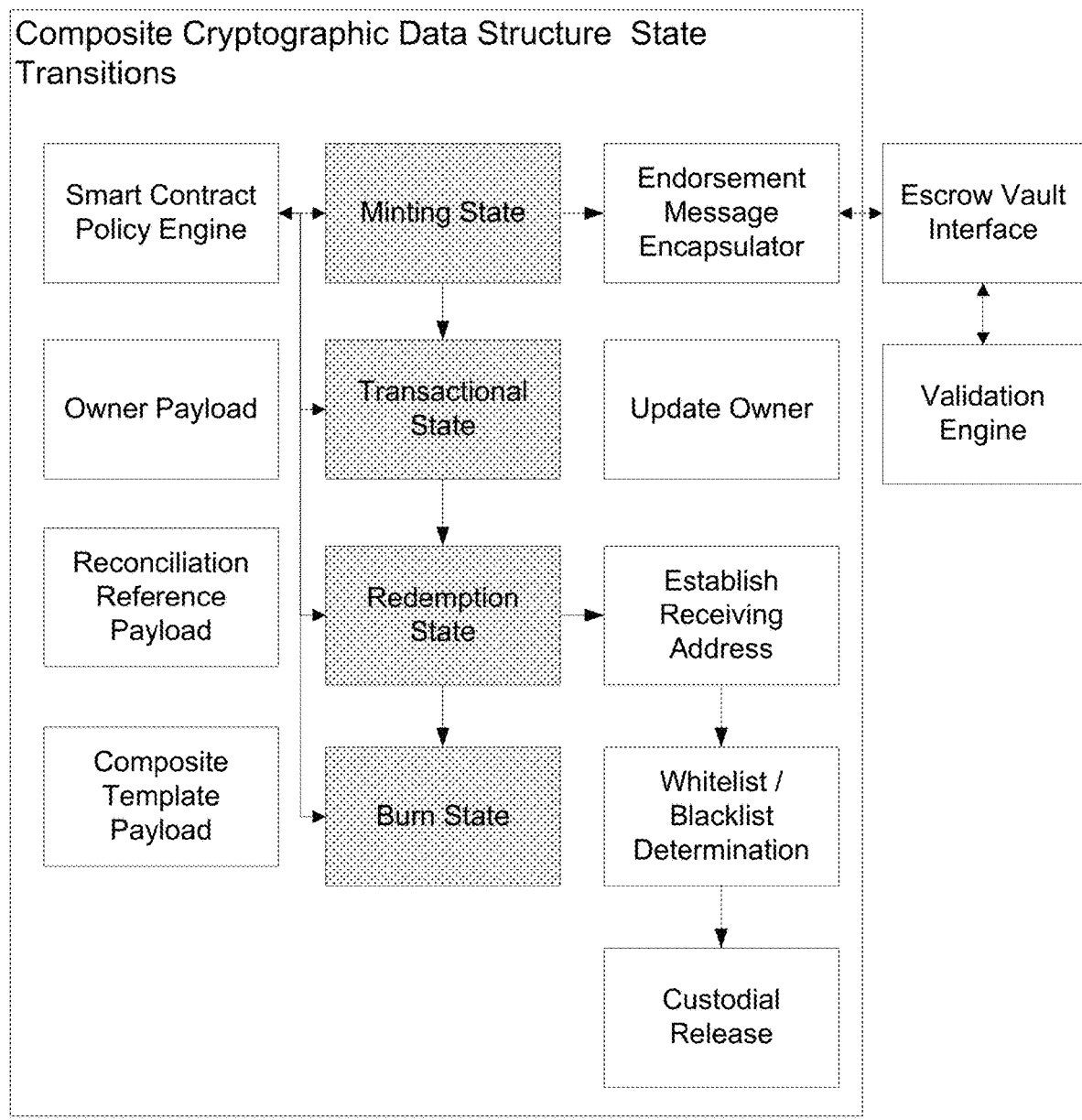
FIG. 1B is a schematic diagram of an example composite crypto-asset data structure, according to some embodiments.

With reference to FIG. 1B, a composite crypto-asset is, in some embodiments, a data structure 100B for representing a basket or grouping of objects. In some embodiments, these objects represent or correspond to things of value. For example, in some embodiments, a composite crypto-asset can be a data structure representing a group of different crypto-assets. In some embodiments, the data structure may represent a group that includes any combination of objects representing different crypto-assets, fiat currencies, equities, bonds, mutual fund units, other financial instruments and/or other representations of value or physical objects.

In an embodiment, the contract is a data structure element that is adapted to store the following parameters: number of units, destination address, identifier, among others. The identifier can be used to match the token to an entity on the database driven ledger system run on an internal platform (e.g., off-chain platform). The contract can, for example, call the ERC-20 token standard, or similar on another blockchain, to mint fungible tokens (e.g., composite data objects) that are representative of the baskets they are for.

The contract also checks to see if the address exists on the whitelist, and if it does, it proceeds. If it doesn't, the address gets added to the whitelist, and is associated with the user that triggers the minting process.

The whitelist can, for example, exist on the blockchain itself as a payload (e.g., a block that is periodically updated with whitelist addresses, and referred to by the smart contract during the minting/redemption/burning process).

As shown in FIG. 1B, the composite crypto-asset data structure is a self-executing and self-enforcing data object which is configured to respond to various triggering conditions, transitioning states between a minting state, a transaction state, a redemption state, and a burn state, as described in various embodiments herein. In a variation, the composite crypto-asset data structure is a self-executing and self-enforcing data object that is "minted" based on an overarching smart contract entity stored on the distributed ledger, which can include the functions thereon which can be called to mint the composite crypto-asset data structures.

Data payloads are stored thereon which indicate a current state, a current owner (e.g., cryptographic public address for which a corresponding private key can be used to effect/record transitions on the composite crypto-asset data structure, for example, to shift ownership, to cause a redemption/decomposition, among others).

In some embodiments, a composite crypto-asset can correspond to or be otherwise defined by a composite template. The composite template definition can define types and quantities of objects being held or represented by the composite crypto-asset.

The composite cryptographic data structure, in some embodiments, is a data structure that is adapted to persist on a distributed ledger that is adapted for holding and performing operations (e.g., state transitions and associated actions), through, for example, a digital protocol to facilitate, verify, and/or enforce policies in relation to the performance of an underlying set of logical conditions (e.g., a smart contract data object). The state changes of the smart contract can be self-executing or self-enforced based on the establishment of triggering conditions, and through received messages that initiate state transitions (e.g., messages with corresponding cryptographic authorization keys).

The composite data structures are configured for interoperation with internal ledger based asset recordal mechanisms (e.g., a recordal platform) and are instantiated when a request is generated to establish an on-chain representation that can be interacted with by members of the public (or private members of a private blockchain, in another embodiment).

Accordingly, the on-chain representation can be established for transfers as between different individuals or entities through on-chain modifications of parameters of the composite data structures (e.g., authorizing a new public key address to be recorded to indicate the new owner of the composite data structure). The underlying cryptographic tokens are not interacted with during these transfers.

When the composite data structure is instantiated, the underlying set of cryptographic tokens have been/are recorded or otherwise obtained for storage at a cryptographic storage facility (e.g., "minted" for storage into cold storage).

In some embodiments, the underlying set of cryptographic tokens for each composite data structure is pooled into one or more cryptographic storage facilities under the custody of one or more custodial computing systems (e.g., financial institution computing systems), and accordingly, the cryptographic storage facility stored tokens are allotted and tracked for each of the composite data structures.

The composite data structures themselves can be transferred between different entities, for example, through updates to either an off-chain ledger, or recorded on on-chain transactions, according to various embodiments.

In some embodiments, the composite data structure includes one or more policy rules that are automatically triggered in various states that cause re-balancing of the underlying allotment of cryptographic tokens and transactions thereof for re-balancing of the underlying allotment of cryptographic tokens in accordance with maintaining a particular characteristic as between the underlying allotment of cryptographic tokens (e.g., to maintain a relative value balance as between the different underlying cryptographic tokens), established based on a market price from a designated oracle entity or other type of market reference (e.g., midpoint of bid/ask at a high volume exchange based on published market data received from an application programming interface).

The composite crypto-asset data structure is configured with a state transition rule established for redemption of the underlying allotment of cryptographic tokens. When this state transition is invoked, the allotment of cryptographic tokens is repatriated such that the allotment of cryptographic tokens are transitioned from the one or more custodial cryptographic storage elements to one or more addresses designated by the redemption message. Addresses, for example, can include cryptographic public keys which may have corresponding private keys held by one or more users or one or more entities.

The composite crypto-asset data structure is then transitioned such that an address without a recorded corresponding private key is set as an authorized entity, effectively rendering the composite data structure inaccessible and rendered dormant (e.g., the composite data structure is "burned").

In some embodiments, the composite crypto-asset data structure includes or references a whitelist or a blacklist data structure indicating specific addresses upon which the allotment of cryptographic tokens can be released to.

In an embodiment, the whitelist data structure can be maintained across one or more financial institution computing systems such that the whitelist data structure only contains addresses whose owners/users are known to have passed corresponding regulatory identity requirements (e.g., know-your-client, anti-money laundering, sanctions).

Conversely, the blacklist data structure can be maintained across one or more financial institution computing systems such that the blacklist data structure only contains addresses whose owners/users are known to have failed corresponding regulatory identity requirements (e.g., know-your-client, anti-money laundering, sanctions).

Updating or maintaining the whitelist or blacklist data structure can be conducted through encapsulated messages from the one or more financial institution computing systems, for example, containing specific payloads that may be encrypted or unencrypted indicative of the specific regulatory validation processes that were employed, a specific identifier of the user that may be known to the one or more financial institution computing systems, or a timestamp of such validation, among others. These encapsulated messages, in some embodiments, are stored on-chain and used for state transitions of the whitelist or blacklist data structure. In some embodiments, each of the one or more financial institution computing systems may be associated with a public/private key pair, which is used to either sign or otherwise digitally verify the origins of such update message (e.g., [BankA Private Key signed {add 0x0024A21ABF to the whitelist, corresponds with [HASH(UserID)], 2019-01-01, 7:02 PM GMT, BOOLEANS indicating passed KYC, AML, sanctions, verified by HASH(UserID2)}.

Where an update message is provided that is not verified, it can be rejected through one or more propagation rules established for accepting/rejecting additions to an on-chain whitelist or blacklist data structure.

For a release of assets, in some embodiments, a release function can only be invoked by an owner whose public address exists on the whitelist data structure (or does not exist on the blacklist data structure, in the variant embodiment). The release function causes a redemption process to be initiated, where the owner of the assets can direct one or more new addresses for the released cryptographic tokens to be transferred from a custodial mechanism (e.g., the one or more cold storage wallets). For example, UserID needs to be on the whitelist, or UserID needs to not be on a blacklist, or both.

Figure 1C:
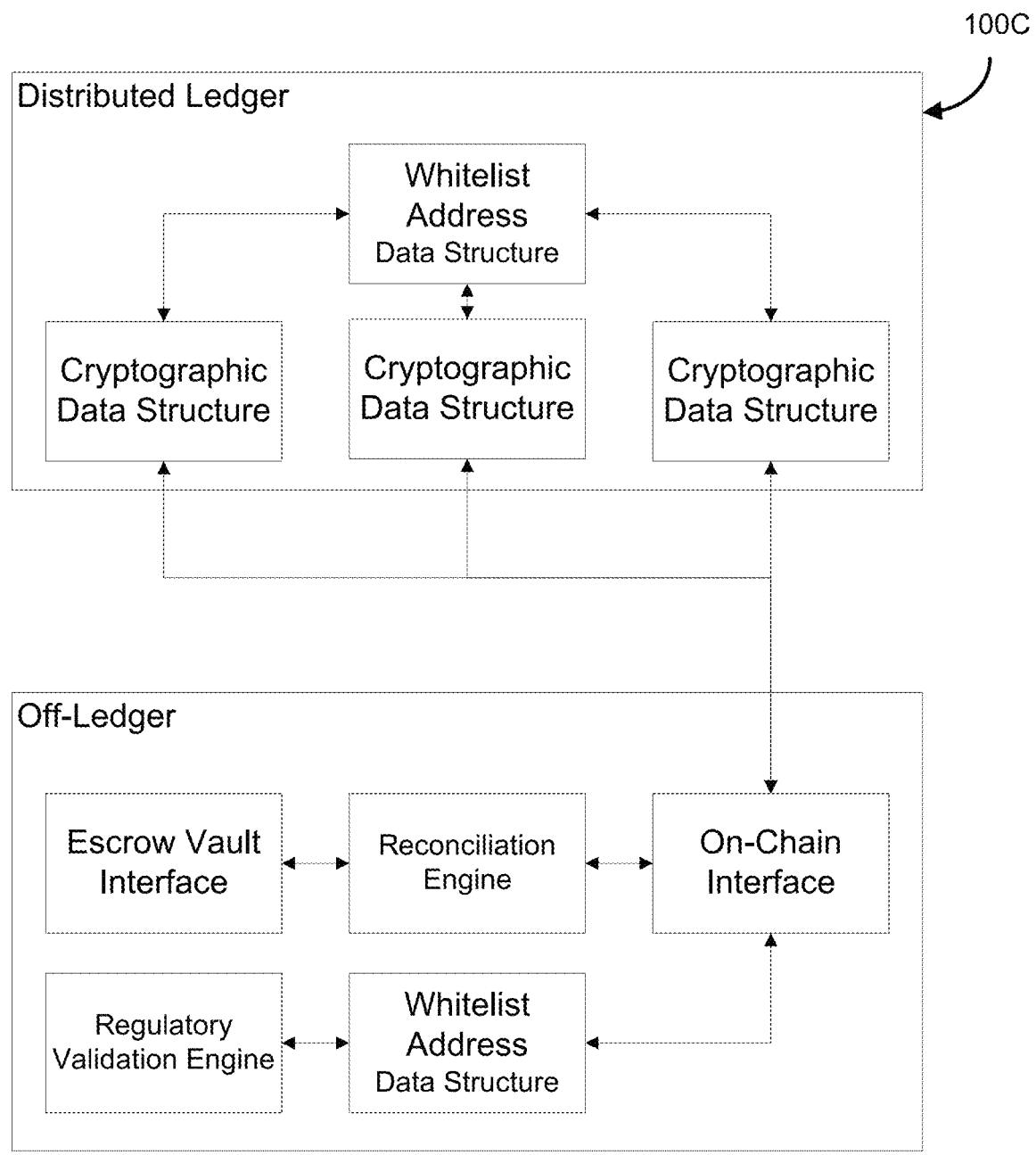
FIG. 1C is a schematic diagram showing interactions between on off-ledger/internal ledger system and the example composite crypto-asset data structure stored on a blockchain of a distributed ledger network, according to some embodiments.

FIG. 1C is a schematic diagram 100C showing interactions between on off-ledger/internal ledger system and the example composite crypto-asset data structure stored on a blockchain of a distributed ledger network, according to some embodiments. In this example, the whitelist address data structure is off-ledger, but in other embodiments, the whitelist address data structure can be an on-ledger data object that is interacted with through the on-chain interface.

As shown in FIG. 1C, the distributed ledger is used to track the composite crypto-asset data structures stored thereon, and their corresponding states. However interactions with the underlying crypto-assets stored in the escrow vault can be conducted off-ledger, with the off-ledger system invoking the instantiation process as well as processing the redemption process. However, transfers of the composite crypto-asset data structures can be effected through the distributed ledger (e.g., through recording new blocks representing transactions and state changes of the composite crypto-asset data structures).

The system allows for lower-friction transactions and lower cost of transactions, as the underlying cryptographic tokens incur less transaction fees. Furthermore, the system provides increased security through the use of specially configured data structures that are referred to for validating and enforcing know-your-client type requirements efficiently at the instantiation process or the redemption process (or both).

Figure 1D:
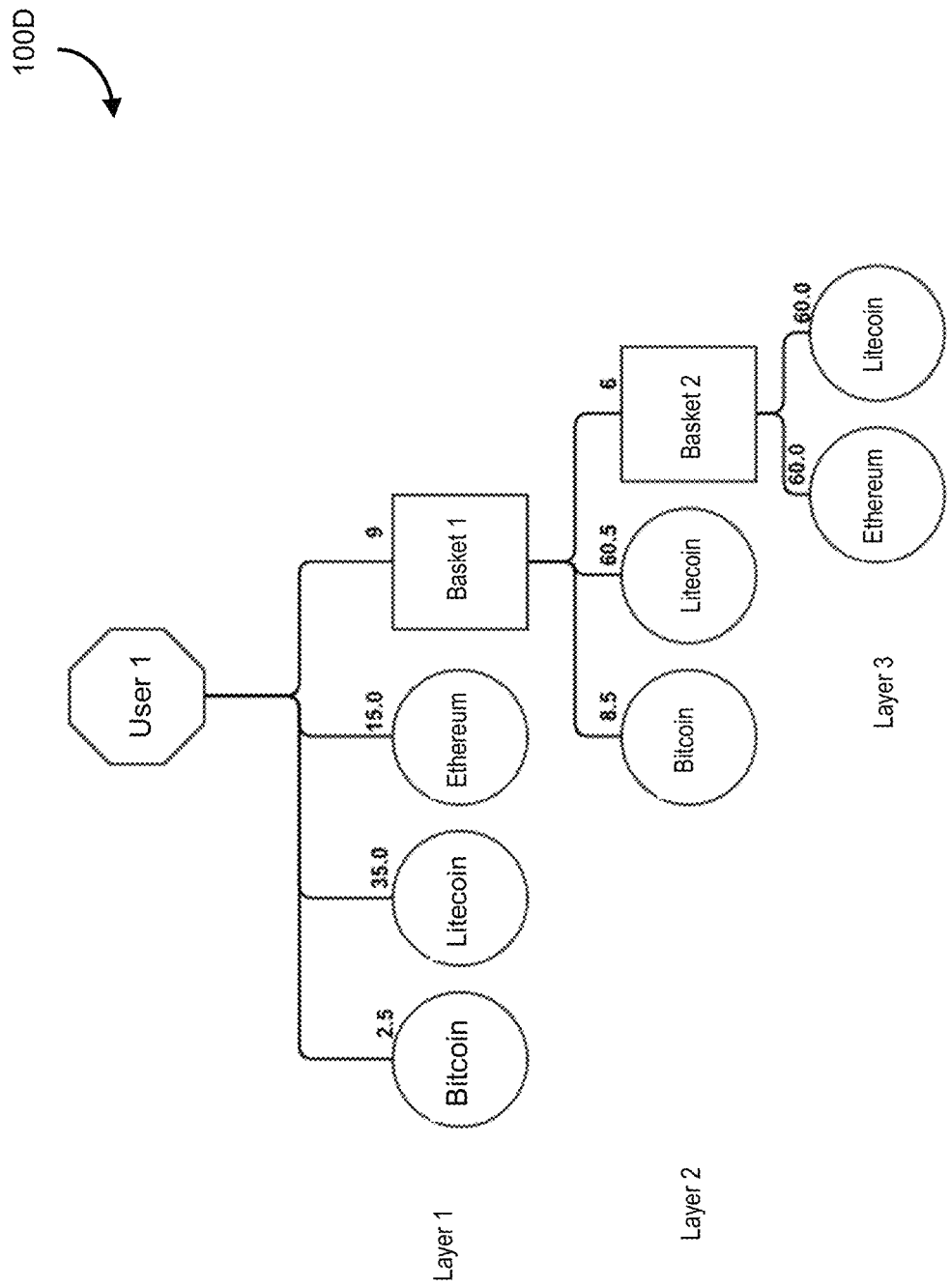
FIG. 1D is a schematic diagram showing an example composite crypto-asset data structure as a basket of underlying crypto-assets and other composite crypto-asset data structures, according to some embodiments.

FIG. 1D is a schematic diagram 100D showing an example composite crypto-asset data structure as a basket of underlying crypto-assets and other composite crypto-asset data structures, according to some embodiments.

Figure 1E:
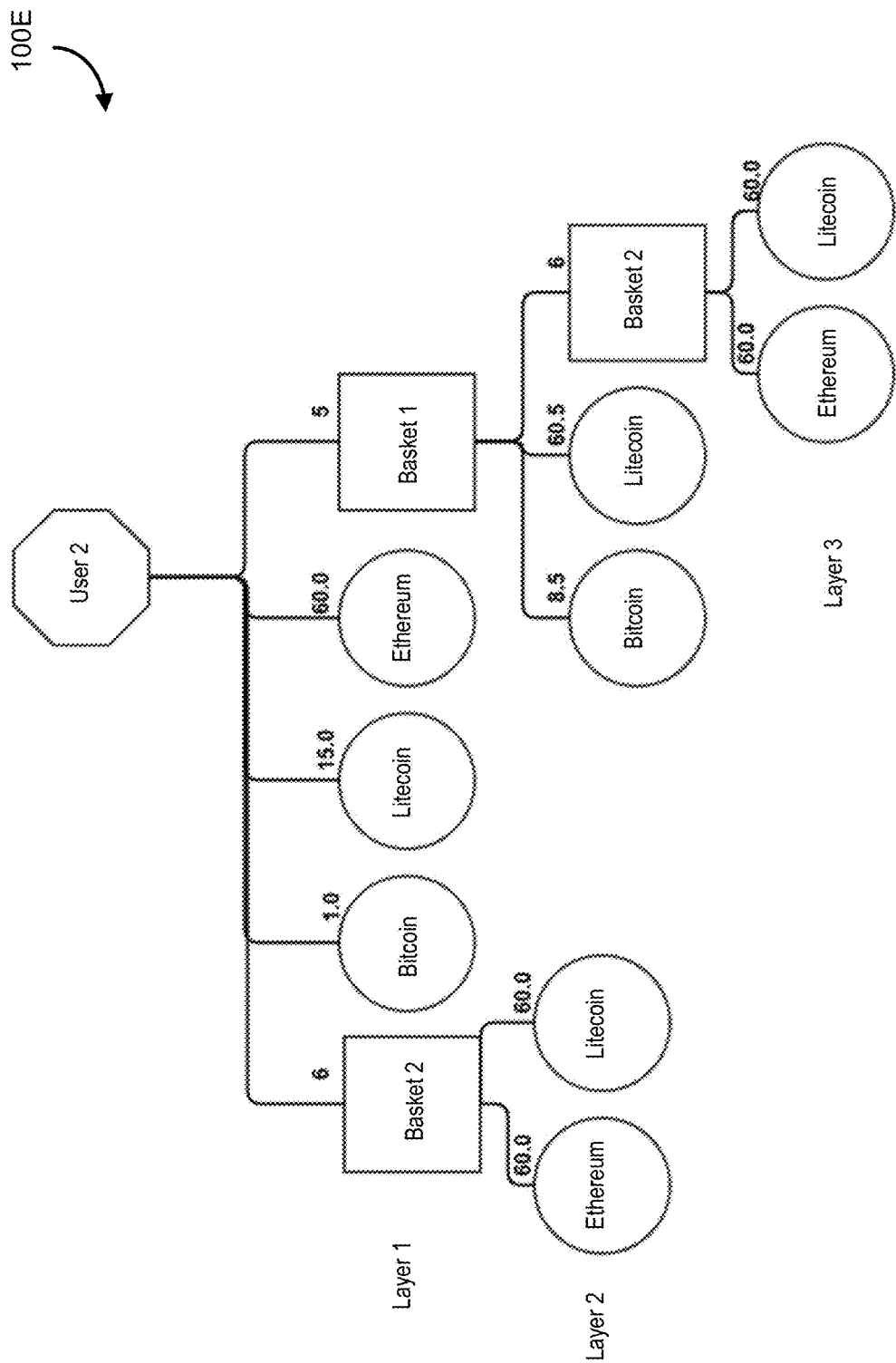
FIG. 1E is a schematic diagram showing an alternate example composite crypto-asset data structure as a basket of underlying crypto-assets and other composite crypto-asset data structures, according to some embodiments.

FIG. 1E is a schematic diagram 100E showing an alternate example composite crypto-asset data structure as a basket of underlying crypto-assets and other composite crypto-asset data structures, according to some embodiments.

Figure 1F:
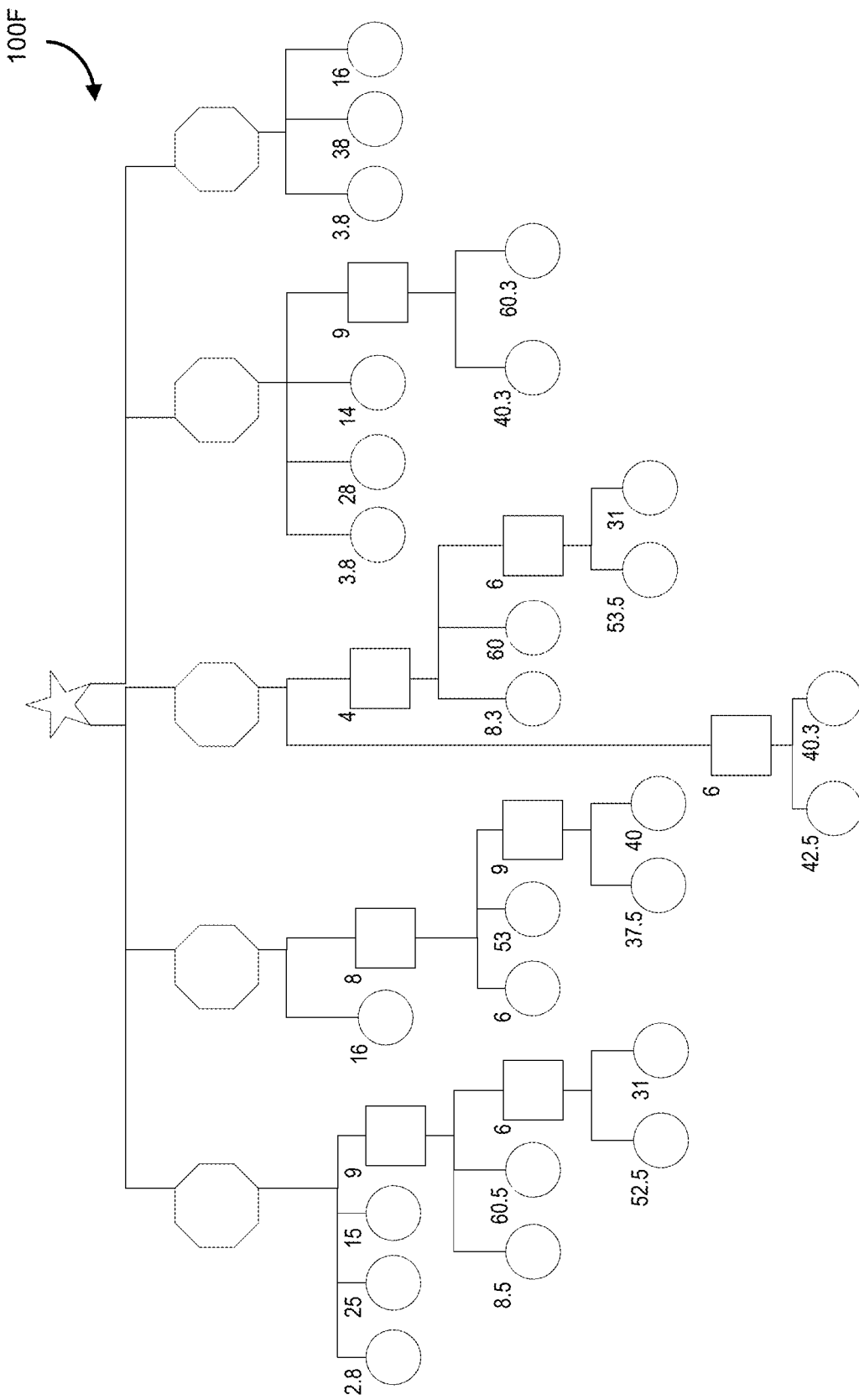
FIG. 1F is a schematic diagram showing an example grouping of composite crypto-asset data structures, according to some embodiments.

FIG. 1F is a schematic diagram 100F showing an example grouping of composite crypto-asset data structures, according to some embodiments.

Figure 2:
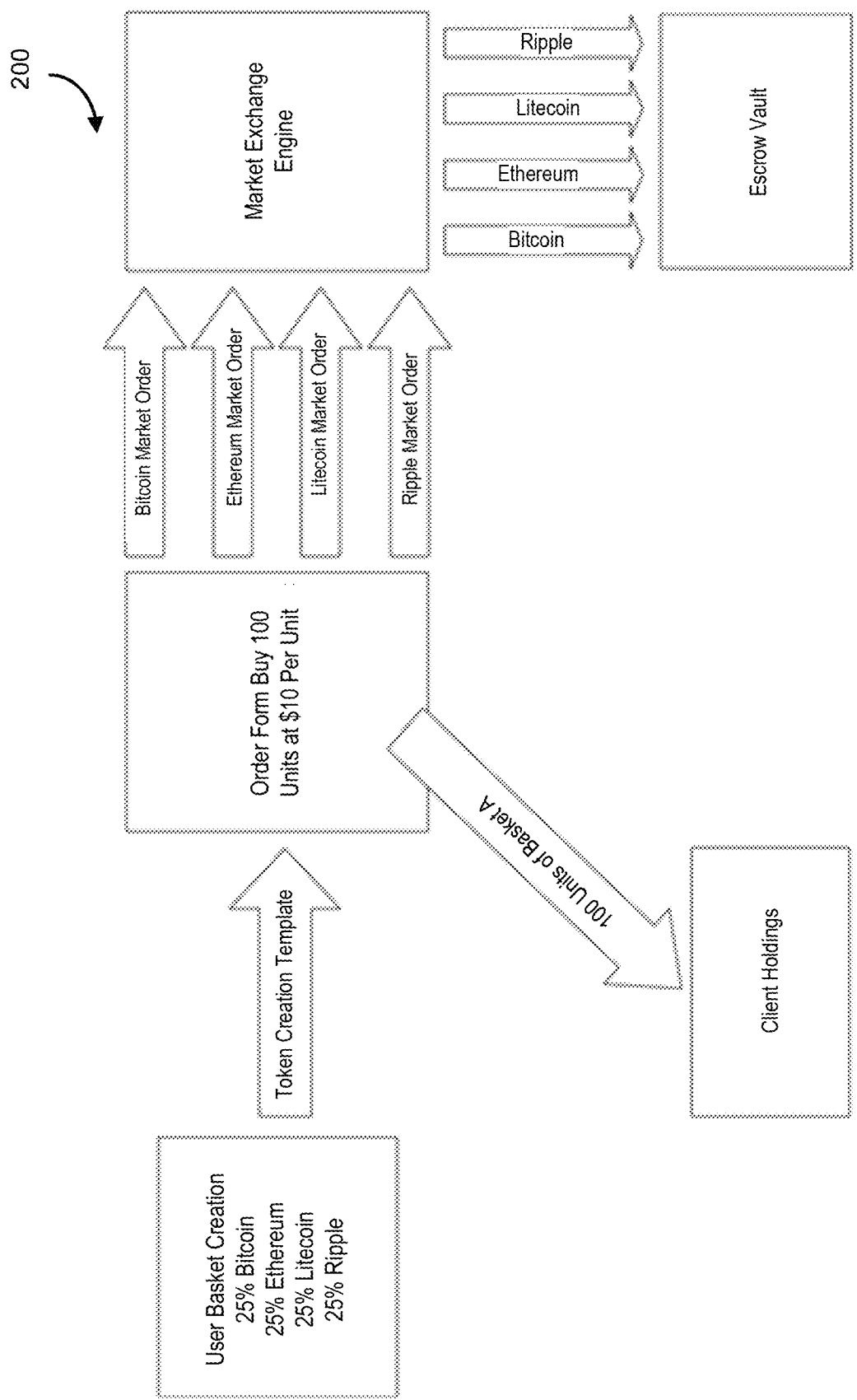
FIG. 2 is a flowchart showing aspects of an example data flow for creating a composite crypto-asset, according to some embodiments.

For example, in FIG. 2, an example composite template is defined as holding 25% bitcoin, 25% ether, 25% Litecoin, and 25% ripple.

In other examples, different composite templates can include different types and quantities of objects.

In some embodiments, the quantities of the types of objects can be defined with respect to a number of units of each type of object. In other embodiments, the quantities of the types of objects can be defined with respect to the market values of the objects in a fiat currency or other denomination.

In some embodiments, the system be configured to periodically rebalance quantities of types of objects in a composite template to maintain a template definition based on market value ratios.

In some situations, the use of composite crypto-assets can provide users with a portfolio building interface that may simplify or reduce the technical interactions with various crypto-asset platforms. In some embodiments, the system may simplify the accounting of portfolio building products.

In some embodiments, composite crypto-asset tokens can be transferred to external blockchain wallets, and can be traded freely. In some embodiments, the composite crypto-asset tokens can be based on the ERC-20 or other token types.

In some embodiments, the system 100 and its technical handling of transactions can reduce blockchain sizes thereby potentially reducing computational overhead and transaction delays.

FIG. 2 is a diagram 200 that shows aspects of an example data flow involving the creation of a composite crypto-asset. Furthermore, as described in various embodiments herein, the composite data structure is configured for easier traversal and validation against cold storage repositories to ensure and/or audit that such custodial amounts match the amount outstanding on the composite data structures stored on-chain. In particular, additional data structures based on the composite data structures may be maintained and thus utilized to facilitate the verification process, as opposed to a multiplicative process, which could be unduly computationally expensive.

In some embodiments, the system 100 can receive an electronic request to acquire a composite crypto-asset. In some instances, the request may be triggered by a user input received from a computing device associated with a broker, a customer or the like.

In some embodiments, the composite crypto-asset corresponds to a composite template defining the types and quantities of different objects represented by the composite crypto-asset.

In some embodiments, the request can be for a composite crypto-asset which is not yet defined by a composite template stored in the system. In some embodiments, the system may create a new composite template data structure including data defining the types of the objects represented by the template, as well as the quantities of each type of object represented by the template. In some embodiments, the objects and quantities for the template may be included in the request or can be received separately. Newly generated templates are, in some embodiments, stored in a template database.

In some embodiments, the system is configured to search a template database for a template matching the composite crypto-asset identified in the request.

In some embodiments, the request provides information for defining how many units of the composite crypto-asset are to be acquired/created. In some embodiments, the number of units may depend on a fiat purchase amount defined by the request, a current market value of the composite crypto-asset (which may be based on a determination of the market values of the underlying crypto or other assets), an explicitly defined number of units in the request, and/or any other relevant factors.

As illustrated in the example transaction in FIG. 2, in some embodiments, the request is for a composite crypto-asset including multiple crypto-assets. In some embodiments, the request triggers the system to generate crypto-asset transactions to acquire quantities of the crypto-assets as defined by the corresponding composite crypto-asset template.

In some embodiments, the crypto-asset transactions can be generated to obtain the crypto-assets via crypto-asset exchanges (e.g. in exchange for fiat funds), via node(s) of a crypto-asset platforms, via a crypto-asset liquidity pool exchange, or any other suitable source for triggering crypto-asset transactions.

In some embodiments, the system stores or otherwise associates the crypto-asset keys obtained via the crypto-asset transactions with an escrow account. In some embodiments, the escrow account can be described as an escrow vault or an account associated with the entity managing the composite crypto-asset system 100 (e.g. such as a financial institution or investment broker).

In some embodiments, the system 100 maintains custody of these keys or crypto-assets in the escrow vault until one or more of the associated composite crypto-assets are sold or decomposed. In some embodiments, the system updates a balance of the composite crypto-asset associated with the customer account based on the transaction.

A user, when creating a composite crypto-asset (e.g., basket) on the platform, can specify a rebalancing frequency at the time of basket creation (Ex. daily, monthly, quarterly). When a rebalancing event occurs, the basket's comprising holdings can be assessed and compared to the basket's target template. If a holding's market value represents a percentage of the total basket value that is inconsistent with the target template, number of units of that holding must be acquired or disposed of to achieve a consistent percentage of total value. In the previous example, if basket B incurs a rebalancing event its holdings must be assessed against the basket's template target percentages of 40/30/30.

If Bitcoin has increased in value disproportionately to the other holdings of the basket, some amount of Bitcoin must be disposed of to achieve the 30% target by value. The amount of Bitcoin to be disposed of is equivalent to the amount such that all of basket B's holding reflect their target percentages as defined in basket B's template. Disposal of holdings consists of transferring the assets from the custodial storage mechanism (e.g., cold storage) to a trading venue and selling at market price. Conversely, if a holding in basket B has lost value disproportionately to the other holdings of the basket, an amount of that holding must be acquired from a trading venue at market price and transferred to the custodial storage mechanism.

For simplicity sake, each unit of a basket is priced at $10 CAD. If the basket composition is: 33.3% Bitcoin, 33.3% Ethereum, and 33.4% Litecoin, each individual basket unit has: $3.33 Bitcoin, $3.33 Ethereum, and $3.34 Litecoin. The actual unit balance is determined at the time of first acquisition. If the current prices for these assets are: Bitcoin $4,000, Ethereum $150, Litecoin $50, the basket initializes with: 0.0008325 BTC, 0.0222 ETH and 0.0668 LTC.

The basket, titled Basket1, now has the composition: 0.0008325 BTC, 0.0222 ETH and 0.0668 LTC. If the user buys 100 units of the basket, it will be at an initial cost of $1,000, and the Platform will then place market orders for the required Bitcoin, Ethereum, and Litecoin to fulfill the request.

The exact composition of the basket (# of units of BTC, ETH and LTC) is not determined until the order is fulfilled on exchange. Only after the market orders are placed and settled, does the basket composition become available. The % change over time can occur due to market conditions, but a periodic auto rebalancing of the basket within the platform occurs to retain its proportions.

The basket is subsequently listed in an aggregate list of baskets. A basket's value fluctuates based on the underlying value of the crypto-assets represented by the basket. All baskets can, for example start at $10, but market conditions may value them higher or lower with time.

In the internal, database driven ledger system, the mechanism is configured to track the new basket and which entity has how much. The platform could also be configured to reconcile the underlying units of the basket to the crypto-assets in the custodial storage system.

A user can create a composite crypto-asset (e.g., basket) that contains portions of pre-existing composite crypto-assets (e.g., other baskets). These "baskets of baskets" may hold one or more baskets of crypto-assets, and directly hold zero or more crypto-assets. The total number of entities in a basket could be 2 or greater. A user can select from a list of pre-existing baskets when creating their basket template.

They must enter the target percentage of all of the baskets and crypto-assets they select for their template. Only baskets that hold crypto-assets alone can be contained in a "basket of baskets". Deeply nesting baskets beyond one level can, in some embodiments, be prohibited to prevent degenerative behavior.

Target percentages are in terms of baskets and crypto-assets. The crypto-assets that are contained within a nested basket are not considered in the percentage of a top-level crypto-asset. For example, a basket B may contain a basket B1 as well as Bitcoin and Ethereum.

This can be represented a B={B1, BTC, ETH}. The target percentages are 40% B1, 30% Bitcoin, and 30% Ethereum. B1 contains three crypto-assets: Bitcoin, Ethereum, Litecoin. The target percentages in basket B1's template is of no consequence to the template definition of basket B.

A rebalancing event at a date after creation of basket B would acquire or dispose of some number of units of B1, Bitcoin, and/or Ethereum to achieve the 40/30/30 target ratio as defined in the template of basket B.

From a data structure perspective, there could be two types of crypto-asset holder: A platform user, or a basket. A database driven ledger system would keep track of the crypto-assets belonging to each individual user. The relationship between a user and crypto-assets can be one to many. The relationship between a basket and crypto-assets can be one to many. The relationship between a basket and basket can be one to many, with limitations outlined above.

The difference in data structure is that a user can hold baskets, but users are ultimately the root of an ownership tree model and users cannot be held by any other entity type. The relationship between a user and a basket is one to many.

Crypto-assets make up the leaves of this tree like structure. To reconcile balances between custodial storage (e.g., cold storage) and user/composite crypto-asset holdings, a function needs to traverse the tree branches and sum the value of crypto-assets at the leaves of the structure and compare totals to that in custodial storage (e.g., cold storage). This type of reconciliation would happen on every change of the data structure (any trade, acquisition, basket creation, etc.) in order to perform real time reconciliation with the number of units in custodial storage (e.g., cold storage). Any unforeseen variance will be caught at the time the variance occurs as a result allowing us to perform corrective action immediately.

Traversing a large enough tree of accounts for reconciliation processes can be a computationally expensive task if the data structure is not designed in an efficient way. To improve computational efficiency, the tree can employ the following optimization approaches:

Preventing duplicate composite crypto-asset data structure profiles: If users attempt to create composite crypto-asset data structures with proportions that already exist in the system, the system does not create a new composite crypto-asset data structure signature in memory. The system reuses the existing composite crypto-asset data structure signature and put the existing structure on offer to the user. By minimizing the number of composite crypto-asset data structures, the system can then reduce calculations on the tree structure through the use of look up tables.

Create a reference data structure (e.g., look up table) for determinations: with each composite crypto-asset data structure type having a known balance of individual units, calculating the amount of crypto assets then becomes a function of multiplying the number of units held by a user to each underlying asset quantity.

With a large enough tree of many users and many holdings, a full reconciliation would equate to many calculations. In an embodiment, a reference data payload is established on the crypto-asset data structure (e.g., a look up table) that stores the product of these determinations based on various holding sizes. The table gets populated as calculations are made for different quantity types. As the tree gets traversed in the future, the system looks up in the table to see if a value exists before performing the mathematical operations. This will allow for rapid sum calculations in real time to compare with the holdings in custodial storage (e.g., cold storage).

For example, in an example embodiment, a client's account is restricted only include 2 baskets deep worth of assets, so it would be a tree of at most 3 layers. Each user would be side by side which would make for a very wide but shallow tree data structure. To take inventory and reconcile with the balance in custodial storage (e.g., cold storage wallets), one would need to traverse the tree from left to right adding up all of the crypto assets along the way. As baskets get pre-calculated, it saves having to re-calculate the values in the baskets themselves, over and over again.

Figure 3:
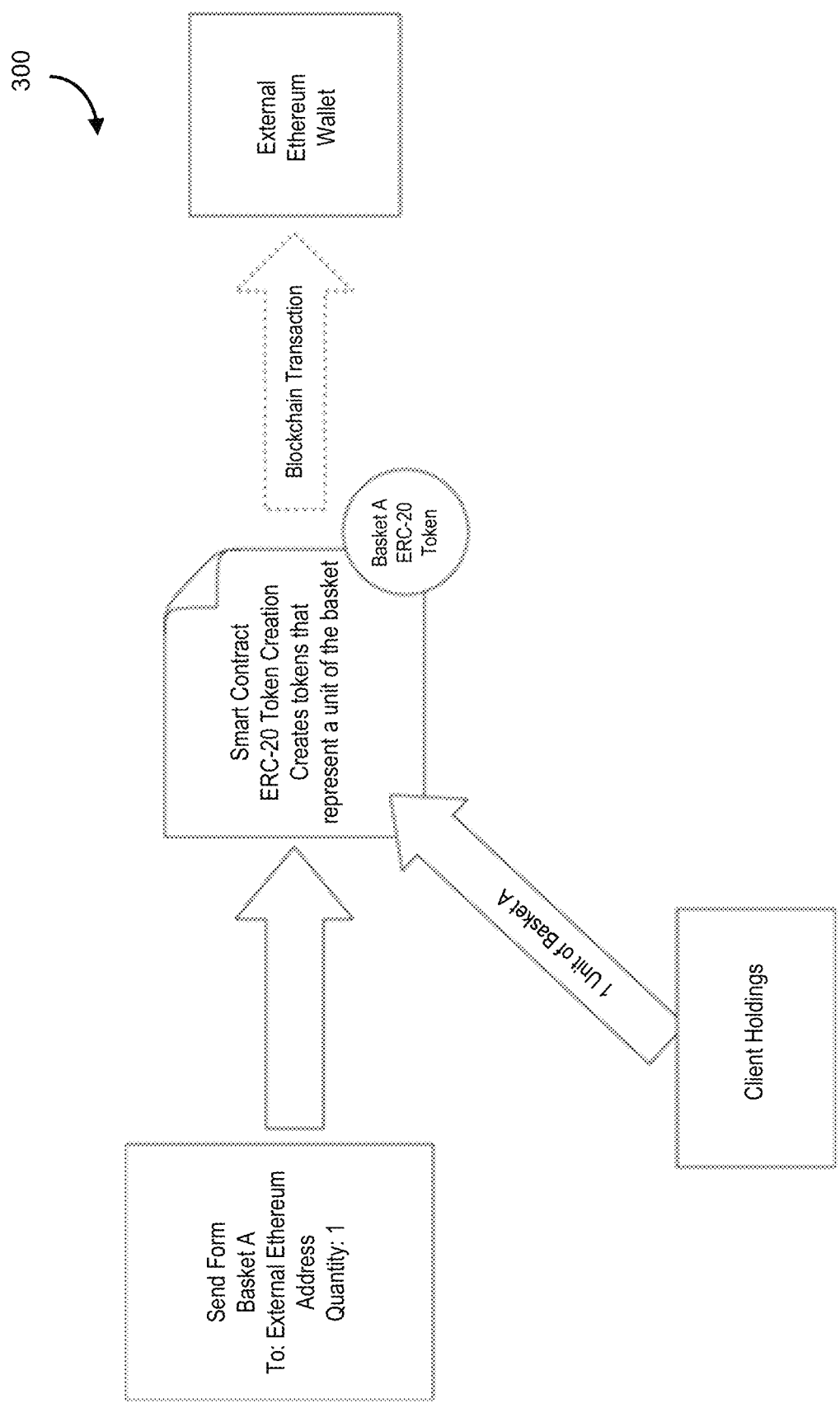
FIG. 3 is a flowchart showing aspects of an example data flow for transferring a composite crypto-asset, according to some embodiments.

FIG. 3 is a diagram 300 that shows aspects of an example data flow involving the transfer of a composite crypto-asset.

The system can be configured receive of electronic signals for transfer of a composite crypto-asset. Upon receipt of these signals, the system is configured to update the balance of the composite crypto-asset associated with the customer account, for example, by decreasing a balance by the quantity to be transferred. The system triggers the generation of one or more composite crypto-asset token(s) corresponding to the quantity to be transferred, and transfers the crypto-asset token(s) to a destination blockchain address.

In some embodiments, the composite crypto-asset token can be based on the Ethereum blockchain platform. In some embodiments, the crypto-asset token is based on the ERC-20 token standard. As noted, in an embodiment, the composite crypto-asset token can be a smart contract, or refer to a smart contract.

In some embodiments, the system is configured to provide a smart contract on a blockchain platform such as Ethereum™. In some embodiments, the smart contract is configured to trigger the creation of a composite crypto-asset token and send it to its destination when a composite crypto-asset is being transferred outside the system (e.g. to an external Ethereum, wallet or other address). In some embodiments, smart contract inputs can include quantities to create, and destinations.

In some embodiments, composite crypto-assets are only represented by a cryptographic token such as an ERC-20 token when it is moved or stored external to the system. When the composite crypto-asset is internal to the system, its quantities and locations are managed internally and no cryptographic token is required.

In some embodiments, the system and/or smart contract can include or otherwise utilize a whitelist of authorized addresses which can hold tokens. In some embodiments, this may improve anti-money laundering protections.

In some situations, by only generating composite crypto-asset tokens when they are to be transferred outside of the system 100, the system 100 may minimize or reduce blockchain sizes and numbers of transactions. In some situations this may reduce computational load and/or result in faster transaction processing.

In some embodiments, composite crypto-assets can be transferred between different accounts managed by the system 100 simply by adjusting balances rather than triggering a blockchain transaction.

Now that the composite crypto-asset data structure is created and accounted for, users can now transact composite crypto-asset data structures amongst other users of the platform. A transfer will move composite crypto-asset data structure items from one user to another in an internal, database driven ledger system. Composite crypto-asset data structures however are not confined to only exist within the platform.

Figure 4:
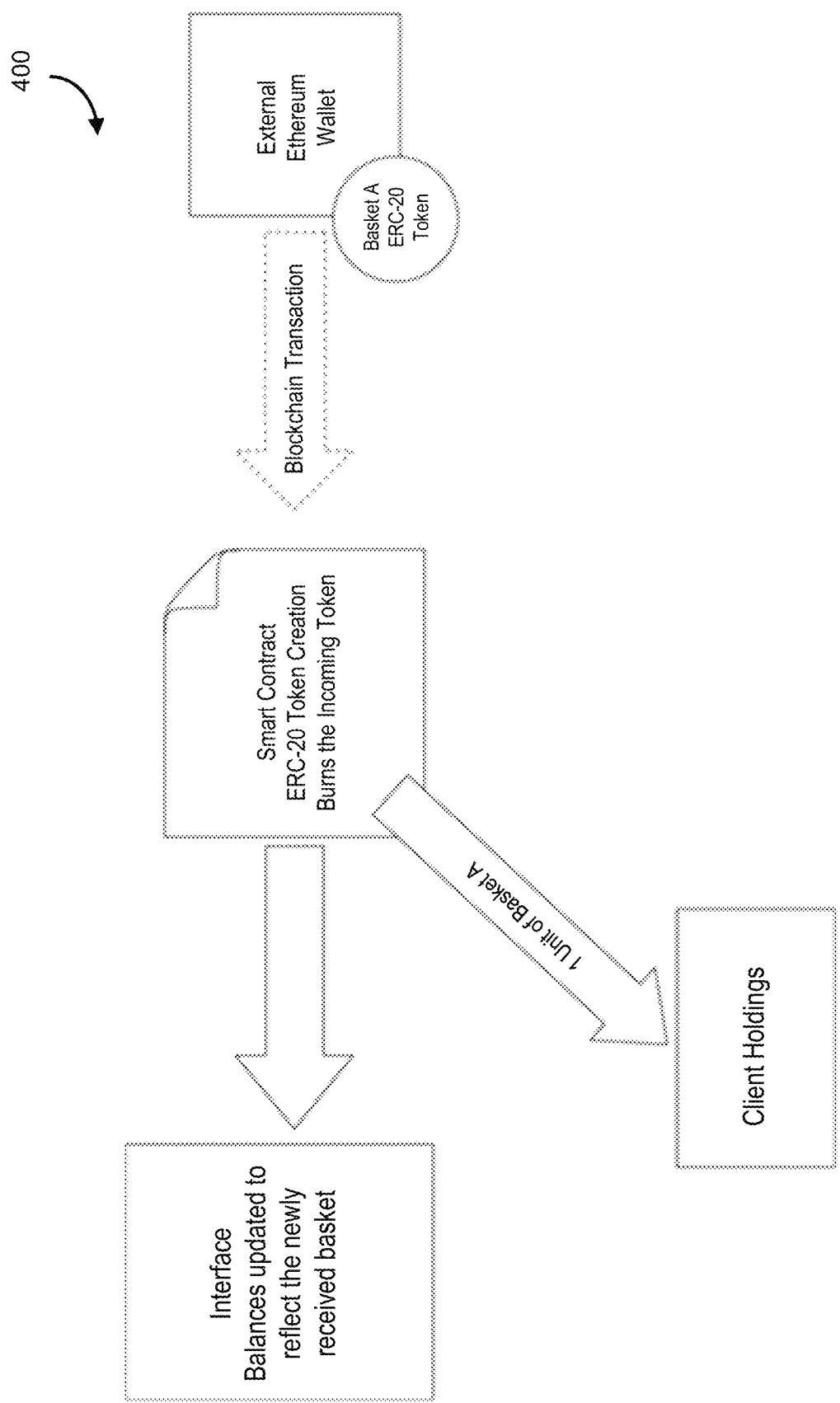
FIG. 4 is a flowchart showing aspects of an example data flow for receiving a composite crypto-asset, according to some embodiments.

FIG. 4 is a diagram 400 that shows aspects of an example data flow involving the receipt of a composite crypto-asset. In some embodiments, the system 100 is configured to receive electronic signals for transferring a composite crypto-asset token to a customer account associated with the system 100.

Users can request a withdrawal of the composite crypto-asset data structure to exist on the blockchain. In order to do this, the user initiates a withdrawal request on the platform. In this request the user specifies a destination blockchain address, to receive the composite crypto-asset data structure token.

The request initializes a token minting procedure where an internal database ledger system accounts for the on-chain composite crypto-asset data structure units, and locks them up from being able to be moved internally.

A smart contract is initialized to mint x units of composite crypto-asset data structure tokens to coincide with the size of the withdrawal request. The minting function in this smart contract takes a number of input parameters:

Token identifier, used to relate the token from the blockchain back to token types on the internal, database driven ledger system.
Number of units to mint, to coincide with the number of units requested in the withdrawal.
Destination Address, to send the newly minted token to.

The newly minted token exists on a distributed ledger (e.g., a blockchain stored on a distributed ledger) and can be transacted to other, distributed ledger addresses. To reverse the process, a user can initialize the repatriation process.

The repatriation process requires the user to deposit a composite crypto-asset data structure token that resides on the public distributed ledger, back into the platform.

The platform generates a deposit address, unique to the user account on the platform that listens for incoming transactions. The user initializes a transaction from their external blockchain address to the unique to user platform address.

For security, the platform can await a specific threshold of block confirmations to be achieved before the deposit is deemed complete. After 5 block confirmations are achieved, for example, the platform can release the original, on platform, composite crypto-asset data structure unit from its lock, and assign it to the user's account in the internal, database driven ledger system.

The system 100 is configured to burn the crypto-asset token and increment or otherwise update a balance of the composite crypto-asset associated with the customer account. In some situations, some embodiments which burn tokens upon their re-entry into the system can reduce blockchain sizes, which may reduce computational costs and/or transaction processing times.

In some embodiments, the system and/or a smart contract is configured to trigger the destruction or burning of a composite crypto-asset token when it is transferred into the system (and is internally managed). In some embodiments, this may prevent double-representations of a composite crypto-asset (e.g. one as an ERC-20 token, and one on the internal closed system/ledger).

As described herein, in some embodiments, when a composite crypto-asset is within the system 100, its does not have an Ethereum or other crypto-token representation, rather custody of the composite crypto-assets are logged by the system itself. When the composite crypto-asset is sent external to the system, it is sent as an Ethereum or other crypto-token representation and exists in the greater blockchain platform (e.g. as an ERC-20 token).

Figure 5:
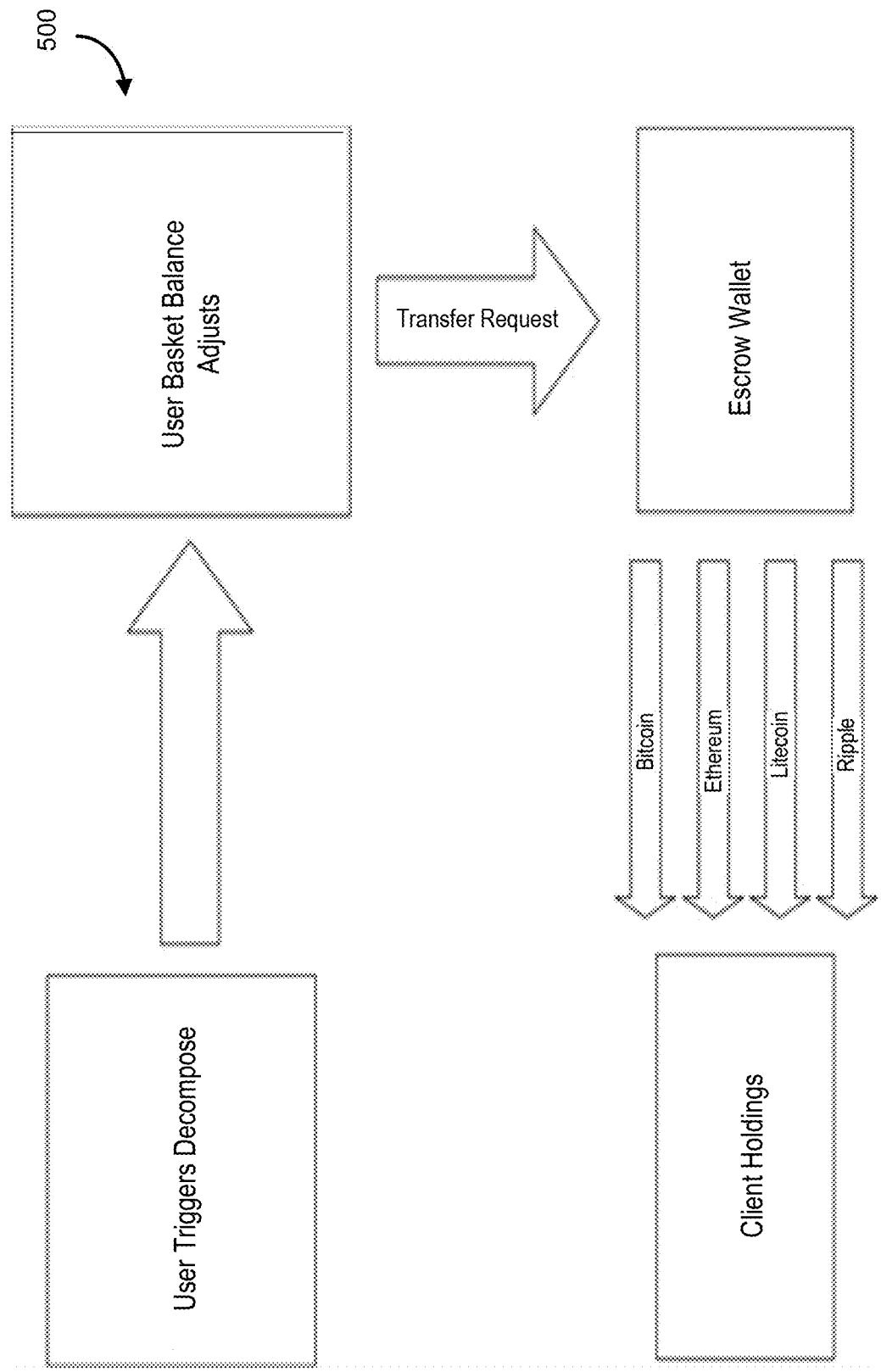
FIG. 5 is a flowchart showing aspects of an example data flow for decomposing a composite crypto-asset, according to some embodiments.

FIG. 5 is a diagram 500 that shows aspects of an example data flow involving the decomposition of a composite crypto-asset.

In some embodiments, the system 100 is configured to receive a decompose request to decompose a quantity of a composite crypto-assets into its constituent parts.

The distributed ledger token still exists, and needs to be burned. In order to facilitate the burning of a token, the platform operator establishes a burn address. A burn address is an address that was generated, but the private key immediately destroyed and never revealed. Assets sent to this burn address are forever dormant. The tokens that were repatriated are now sent to the burn address.

The process of burning the token is to ensure that the token can never be used without authorization, and therefore ensures the reconciliation of assets in custodial storage (e.g., cold storage) and composite crypto-asset data structure values that are live.

The system 100 is configured to decrement or otherwise update the balance of the composite crypto-assets in the customer account.

In some embodiments, the system 100 is configured to withdraw the constituent objects from the escrow account and transfer them to the customer account.

In some embodiments, this involves using cryptographic keys corresponding to constituent crypto-assets in the escrow vault to transfer or otherwise trigger a transaction which transfers the constituent crypto-assets to an address associated with the customer account.

Figure 6:
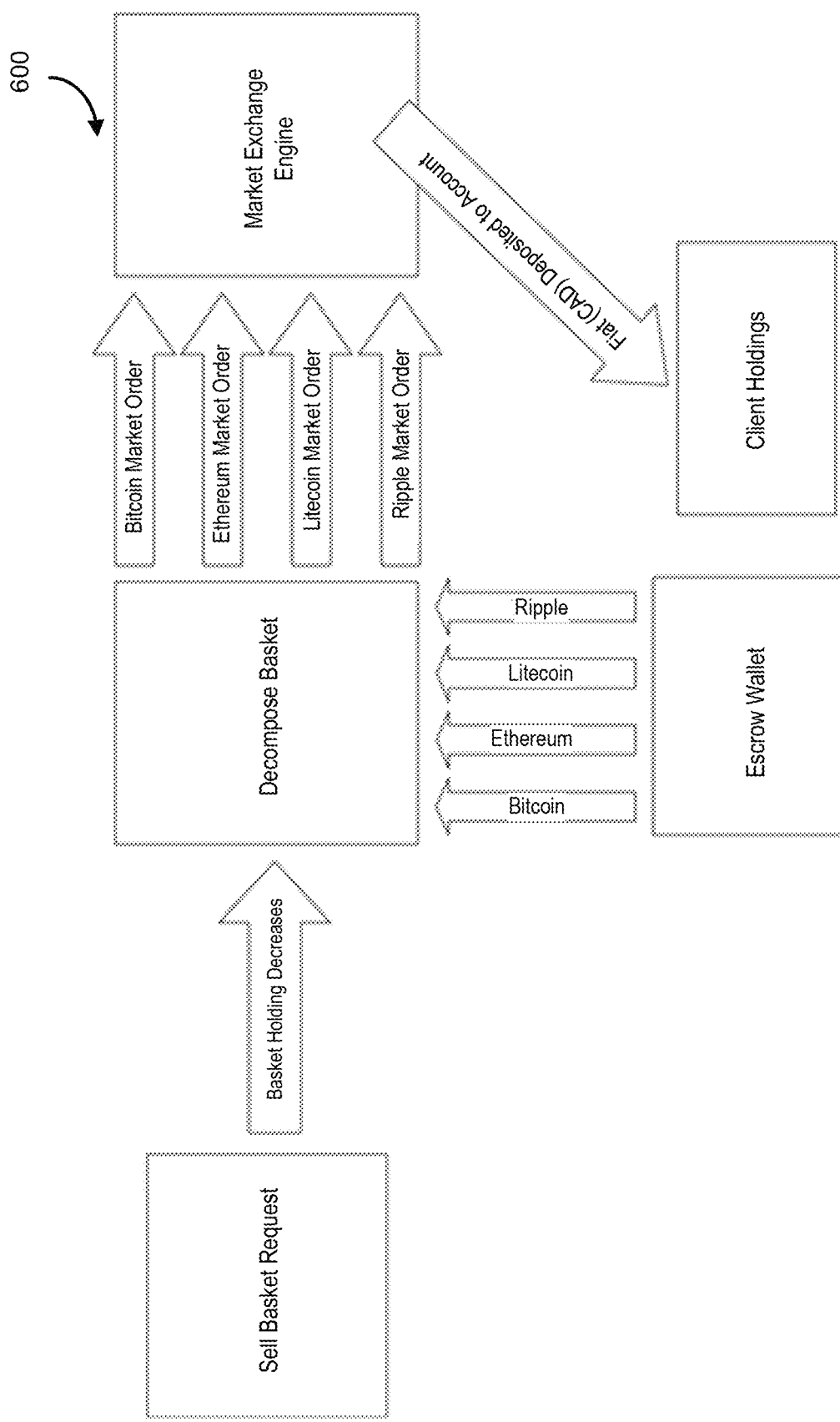
FIG. 6 is a flowchart showing aspects of an example data flow for selling a composite crypto-asset, according to some embodiments.

FIG. 6 is a diagram 600 that shows aspects of an example data flow involving the sale of a composite crypto-asset.

In some embodiments, the system 100 is configured to receive a sell request to sell a quantity of composite crypto-assets into its constituent parts. The system 100 is configured to decrement or otherwise update the balance of the composite crypto-assets in the customer account. In some embodiments, the system 100 is configured to withdraw the constituent objects from the escrow account and transfer them to a liquidity pool or other exchange. In some embodiments, this involves using cryptographic keys corresponding to constituent crypto-assets in the escrow vault to transfer or otherwise trigger a transaction which transfers the constituent crypto-assets to an address associated with the crypto-asset exchange (e.g. a liquidity pool address or otherwise).

The system 100 is configured to increment or otherwise update the balance of a fiat or other currency in the customer account based on the value received from the transactions.

If the user would like to redeem the coin for its individual parts, from within the platform, they have triggered the redemption process through a feature in the platform. The redemption process re-structures the accounting tree to remove the composite crypto-asset data structure units in holding and credits the account with the number of underlying units.

If the user already holds assets that are already part of the composite crypto-asset data structure, the balances adjust to reflect the redemption. In the Platform, the reference to that composite crypto-asset data structure unit ceases to exist, and the reconciliation of asset values to custodial storage (e.g., cold storage) should coincide.

KYC & AML Considerations

In order to repatriate a composite crypto-asset data structure token, users of the platform, in some embodiments, are required to be KYC verified. The system safeguards this through whitelisting of wallet addresses.

Whitelisting can happen in one of two processes (or both), according to some embodiments:
1. Withdrawal request
2. Account creation on the platform A user of the platform is granted their account on the platform as a result of passing KYC and AML verification.

When the user initializes a withdrawal request, they specify a destination address to send the newly minted token to. The platform validates the destination address through Blockchain forensic tools, and if validated, the address enters the whitelist.

In an embodiment, the whitelist is stored as a data payload on the smart contract that powers and manages the composite crypto-asset data structure tokens that reside on chain. All composite crypto-asset data structure token transfers are required to meet the whitelisting criteria set forth by the contract. If a user wants to repatriate a token into the platform, the source address before repatriation must be whitelisted. If the address is not whitelisted, the transfer fails and the tokens remain where they are. In other embodiments, the whitelist is an external data structure that is referred to by the smart contract prior to initiating the release/repatriation process.

Alternatively, if a user that is not whitelisted, but is in possession of the composite crypto-asset data structure token, would like to repatriate a token into the platform, they can sign up for an account on the platform, and whitelist their address in the process. Once the account is created, they would now be free to deposit the composite crypto-asset data structure token into the platform.

The smart contract data structure, of some embodiments, features a function for whitelisting addresses that takes in the following parameters: address to whitelist, cryptographically signed endorsement from the Platform owner. When the user withdraws from the platform, the function is called with the address to whitelist set as the user's destination address, and a cryptographically signed endorsement that is signed by the platform system.

The platform houses a secure private key that signs whitelisting endorsements to the smart contract as to validate and approve new entries. Establishing this requirement prevents anyone from calling the function and whitelisting any address. When a user opens an account on the platform, the user has the option to whitelist an address through the platform interface. This will call the whitelisting function with the address the user submits, and the signed endorsement from the platform.

By only allowing whitelisted addresses to repatriate the tokens, a user without a whitelisted address has little economic value to the holdings and is therefore dis-incentivized to hold the asset. The economic value of the holding increases for the user if they sign up for the platform, but otherwise, it does not. This helps alleviate money laundering risk.

Figure 7:
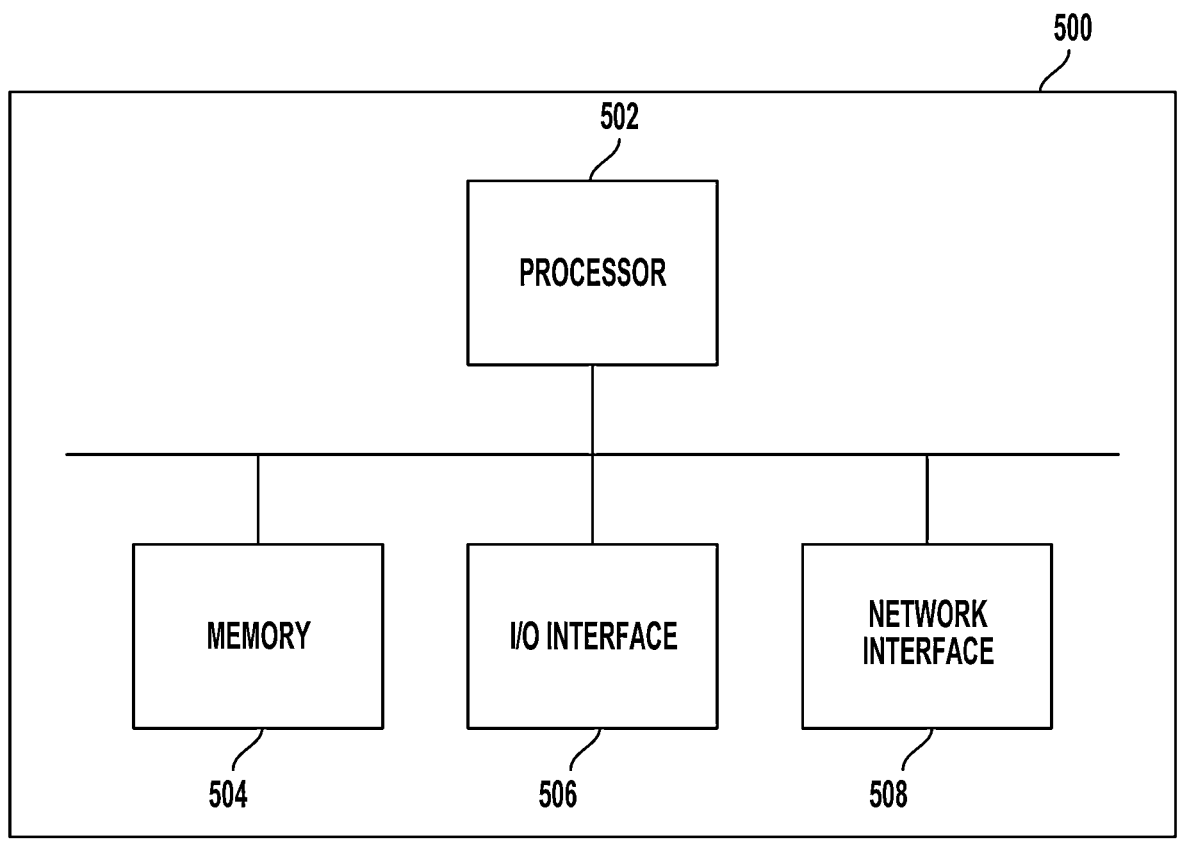
FIG. 7 is a schematic diagram showing aspects of an example computing device which can comprise part of a system for managing crypto-assets/transactions, according to some embodiments.

FIG. 7 is a schematic diagram of computing device 500, exemplary of an embodiment. As depicted, computing device 500 includes at least one processor 502, memory 504, at least one I/O interface 506, and at least one network interface 508.

Each processor 502 may be, for example, microprocessors or microcontrollers, a digital signal processing (DSP) processor, an integrated circuit, a field programmable gate array (FPGA), a reconfigurable processor, a programmable read-only memory (PROM).

Memory 504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 506 enables computing device 500 to interconnect with one or more input devices, such as a keyboard, mouse, camera, touch screen and a microphone, or with one or more output devices such as a display screen and a speaker.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combinations.

Computing device 500 is operable to register and authenticate users (using a login, unique identifier, and password for example) prior to providing access to applications, a local network, and network resources, other networks and network security devices. Computing devices 500 may serve one user or multiple users.

In some embodiments, the composite crypto-asset data structures can be established such that the composite crypto-asset data structures can be nested together such that a composite crypto-asset data structure can include other composite crypto-asset data structures as underlying crypto-assets.

As an example, the composite crypto-asset data structures can include baskets of baskets.

If a user identifies that a particular asset mix of an existing basket is particularly profitable, the user may wish to include that composite crypto-asset data structure as an underlying crypto-asset to be stored as part of the user's basket represented in the composite crypto-asset data structure.

However, in some embodiments, to avoid potential circular logic flows, a constraint may be applied to composite crypto-asset data structure generation such that only a pre-defined layer of composite crypto-asset data structures can be stored within a particular composite crypto-asset data structure.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system comprising:
at least one memory for storing a customer account; and
at least one processor communicably coupled to the at least one memory, the at least one memory including executable instructions which when executed by the at least one processor, configure the system for:
receiving an electronic request to instantiate a composite crypto-asset data structure including a reference data payload that maintains one or more pre-calculated products based on a plurality of different quantity sizes that is populated as new product operations are conducted, the composite crypto-asset data structure corresponding to a plurality of types of crypto-assets and their respective quantities the composite crypto-asset data structure including a set of logical conditions stored on a publicly accessible blockchain distributed ledger network, which when triggered as one or more monitored conditions are satisfied, cause state transitions of the composite crypto-asset data structure from states that include at least a minting state, a transaction state, a redemption state, and a burn state;
the request initializing a token minting procedure where an internal database ledger system accounts for on-chain composite crypto-asset data structure units coinciding with a size of the electronic request;
storing cryptographic keys corresponding to the respective quantities of the plurality of types of crypto-assets in an escrow vault;
updating a balance of the composite crypto-asset data structure associated with the customer account based on a quantity associated with the electronic request; and
periodically executing a validation function for reconciling total crypto-assets in the escrow vault against all outstanding composite crypto-asset data structures by:
conducting a block-traversal of all outstanding composite crypto-asset data structures,
utilizing the reference data payload to determine an amount of crypto-assets of a particular type, where a quantity indicated in the corresponding composite crypto-asset data structure has already been pre-calculated, and
conducting a calculation of the amount of crypto-assets of a particular type only when the quantity indicated in the corresponding composite crypto-asset data structure has not been pre-calculated.

2. The system of claim 1, wherein the at least one memory stores a periodically updated whitelist data structure, and wherein the composite crypto-asset data structure is instantiated responsive to receiving the electronic request, the composite crypto-asset data structure storing a data payload including a cryptographic address representing a current owner of the composite crypto-asset, and wherein upon instantiation the cryptographic address is added to the whitelist data structure;
the system comprising a data message interface configured for:
communicating one or more data messages with one or more external compliance validation systems, the one or more data messages including at least instructions for periodically updating the whitelist data structure.

3. The system of claim 2, wherein when executed, the executable instructions configure the system for:
receiving a transfer request to transfer a second quantity of the composite crypto-asset data structure associated with the customer account to a destination blockchain address and transition the composite crypto-asset data structure to the transaction state;
updating the balance of the composite crypto-asset data structure associated with the customer account based on the second quantity of the composite crypto-asset data structure to be transferred; and
triggering generation of a crypto-asset token corresponding to the second quantity of the of the composite crypto-asset data structure to be transferred, and transfer of the crypto-asset token to the destination blockchain address stored on the data payload of the composite crypto-asset data structure.

4. The system of claim 2, wherein when executed, the executable instructions configure the system for:
receiving a decompose request from the cryptographic address representing the current owner of the composite crypto-asset to decompose a second quantity of the composite crypto-asset data structure associated with the customer account and transitioning the composite crypto-asset data structure to the redemption state;
updating the balance of the composite crypto-asset data structure associated with the customer account based on the second quantity of the composite crypto-asset data structure to be transferred;
determining whether the cryptographic address exists on the periodically updated whitelist data structure; and
if the cryptographic address exists on the periodically updated whitelist data structure, using the cryptographic keys corresponding to the plurality of types of crypto-assets in an escrow vault, transferring quantities of the plurality of types of crypto-assets, corresponding to the second quantity, from addresses associated with the escrow account to addresses associated with the customer account and transitioning the composite composite crypto-asset data structure to the burn state.

5. The system of claim 1, wherein when executed, the executable instructions configure the system for:
receiving a sell request to sell a second quantity of the composite crypto-asset data structure associated with the customer account;
updating the balance of the composite crypto-asset data structure associated with the customer account based on the second quantity of the composite crypto-asset data structure to be transferred;
using the cryptographic keys corresponding to the plurality of types of crypto-assets in an escrow vault, transferring quantities of the plurality of types of crypto-assets, corresponding to the second quantity of the composite crypto-asset data structure, from addresses associated with the escrow account to addresses associated with a crypto-asset exchange; and
updating a fiat balance associated with the customer account based on fiat amounts received from transferring the quantities of the plurality of types of crypto-assets.

6. A method for processing composite cryptographic transactions, the method comprising:
receiving an electronic request to instantiate a composite crypto-asset data structure including a reference data payload that maintains one or more pre-calculated products based on a plurality of different quantity sizes that is populated as new product operations are conducted, the composite crypto-asset data structure corresponding to a plurality of types of crypto-assets and their respective quantities the composite crypto-asset data structure including a set of logical conditions stored on a publicly accessible blockchain distributed ledger network, which when triggered as one or more monitored conditions are satisfied, cause state transitions of the composite crypto-asset data structure from states that include at least a minting state, a transaction state, a redemption state, and a burn state;
initializing, responsive to the request, a token minting procedure where an internal database ledger system accounts for on-chain composite crypto-asset data structure units coinciding with a size of the electronic request;
storing cryptographic keys corresponding to the respective quantities of the plurality of types of crypto-assets in an escrow vault;
updating a balance of the composite crypto-asset data structure associated with the customer account based on a quantity associated with the electronic request; and
periodically executing a validation function for reconciling total crypto-assets in the escrow vault against all outstanding composite crypto-asset data structures by:
conducting a block-traversal of all outstanding composite crypto-asset data structures,
utilizing the reference data payload to determine an amount of crypto-assets of a particular type, where a quantity indicated in the corresponding composite crypto-asset data structure has already been pre-calculated, and
conducting a calculation of the amount of crypto-assets of a particular type only when the quantity indicated in the corresponding composite crypto-asset data structure has not been pre-calculated.

7. The method of claim 6, wherein the crypto-asset data structure includes a smart contract data object that stores a periodically updated whitelist data structure, and wherein the composite crypto-asset data structure is instantiated responsive to receiving the electronic request, the composite crypto-asset data structure storing a data payload including a cryptographic address representing a current owner of the composite crypto-asset, and wherein upon instantiation the cryptographic address is added to the whitelist data structure.

8. The method of claim 7, comprising:
receiving a transfer request to transfer a second quantity of the composite crypto-asset data structure associated with the customer account to a destination blockchain address, and transition the composite crypto-asset data structure to the transaction state;
updating the balance of the composite crypto-asset data structure associated with the customer account based on the second quantity of the composite crypto-asset data structure to be transferred; and
triggering generation of a crypto-asset token corresponding to the second quantity of the of the composite crypto-asset data structure to be transferred, and transfer of the crypto-asset token to the destination blockchain address stored on the data payload of the composite crypto-asset data structure.

9. The method of claim 7, comprising:
receiving a decompose request from the cryptographic address representing the current owner of the composite crypto-asset to decompose a second quantity of the composite crypto-asset data structure associated with the customer account and transitioning the composite crypto-asset data structure to the redemption state;
updating the balance of the composite crypto-asset data structure associated with the customer account based on the second quantity of the composite crypto-asset data structure to be transferred;
determining whether the cryptographic address exists on the periodically updated whitelist data structure; and
if the cryptographic address exists on the periodically updated whitelist data structure, using the cryptographic keys corresponding to the plurality of types of crypto-assets in an escrow vault, transferring quantities of the plurality of types of crypto-assets, corresponding to the second quantity, from addresses associated with the escrow account to addresses associated with the customer account, and transitioning the composite crypto-asset data structure to the burn state.

10. The method of claim 6, wherein the composite crypto-asset data structure is based on a ERC-20 token standard.

11. The method of claim 7, wherein the whitelist data structure is stored as a reference payload on the publicly accessible blockchain distributed ledger network.

12. The method of claim 6, wherein the escrow vault includes one or more cold storage wallets.

13. The method of claim 6, wherein the state transitions occur responsive to data messages transmitted through the publicly accessible blockchain distributed ledger network.

* * * * *